US012410613B2

(12) United States Patent
Collins et al.

(10) Patent No.: US 12,410,613 B2
(45) Date of Patent: Sep. 9, 2025

(54) PRE-MANUFACTURED LOAD BEARING WALLS FOR A MULTI-STORY BUILDING

(71) Applicant: Innovative Building Technologies, LLC, Seattle, WA (US)

(72) Inventors: Arlan E. Collins, Seattle, WA (US); Mark L. Woerman, Seattle, WA (US); Mark D'Amato, Seattle, WA (US); Eric P. Hinckley, Superior, CO (US); Calder Danz, Seattle, WA (US); Christopher J. Allen, Aloha, OR (US); Dale V. Paul, Poulsbo, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 186 days.

(21) Appl. No.: 18/248,961

(22) PCT Filed: Oct. 21, 2021

(86) PCT No.: PCT/US2021/056077
§ 371 (c)(1),
(2) Date: Apr. 13, 2023

(87) PCT Pub. No.: WO2022/087283
PCT Pub. Date: Apr. 28, 2022

(65) Prior Publication Data
US 2023/0417049 A1 Dec. 28, 2023

Related U.S. Application Data

(60) Provisional application No. 63/178,515, filed on Apr. 22, 2021, provisional application No. 63/104,239, filed on Oct. 22, 2020.

(51) Int. Cl.
*E04B 1/08* (2006.01)
*B66B 11/00* (2006.01)
(Continued)

(52) U.S. Cl.
CPC ............ *E04B 5/04* (2013.01); *B66B 11/0005* (2013.01); *E04B 1/02* (2013.01); *E04B 1/08* (2013.01);
(Continued)

(58) Field of Classification Search
CPC ............. E04B 2001/2481; E04B 9/008; E04B 1/2403; E04B 1/24; E04B 1/18
(Continued)

(56) References Cited

U.S. PATENT DOCUMENTS 4,919,164 A * 4/1990 Barenburg ................ E04B 2/82 137/15.08
5,076,310 A * 12/1991 Barenburg ................ E04B 2/82 137/15.08
(Continued)

OTHER PUBLICATIONS

USPTO, Written Opinion for International Patent Application No. PCT/US2021/056077, Jan. 24, 2022, 5 pages.
(Continued)

*Primary Examiner* — Paola Agudelo
(74) *Attorney, Agent, or Firm* — IP Spring

(57) ABSTRACT

A multi-story building is provided with load bearing walls that are able to withstand vertical loads and lateral loads. The building may be a low-rise building or a mid-rise building. The load bearing walls, as well as floor-ceiling panels, corridor panels, utility walls, and other parts of the building, are pre-manufactured off-site and then installed on-site at the site of the building. The floor-ceiling panels are hung from the load bearing walls and are capable to receive and transfer lateral and vertical loads, as well as providing improved sound proofing and fire rating for the building.

20 Claims, 15 Drawing Sheets

(51) Int. Cl.

| | |
|---|---|
| ***E04B 1/02*** | (2006.01) |
| ***E04B 1/24*** | (2006.01) |
| ***E04B 1/348*** | (2006.01) |
| ***E04B 1/61*** | (2006.01) |
| ***E04B 2/60*** | (2006.01) |
| ***E04B 5/04*** | (2006.01) |
| ***E04B 5/10*** | (2006.01) |
| ***E04B 9/00*** | (2006.01) |
| ***E04B 9/04*** | (2006.01) |
| *E04B 5/02* | (2006.01) |

(52) U.S. Cl.
CPC .............. *E04B 1/24* (2013.01); *E04B 1/2403* (2013.01); *E04B 1/3483* (2013.01); *E04B 1/34869* (2013.01); *E04B 1/612* (2013.01); *E04B 1/6125* (2013.01); *E04B 2/60* (2013.01); *E04B 5/10* (2013.01); *E04B 9/008* (2013.01); *E04B 9/04* (2013.01); *E04B 2001/2415* (2013.01); *E04B 2001/2418* (2013.01); *E04B 2001/2451* (2013.01); *E04B 2001/2481* (2013.01); *E04B 2001/6191* (2013.01); *E04B 2001/6195* (2013.01); *E04B 5/02* (2013.01); *E04B 2103/06* (2013.01)

(58) Field of Classification Search
USPC .......................................................... 52/236.9
See application file for complete search history.

(56) References Cited

U.S. PATENT DOCUMENTS

| | | | | |
|---|---|---|---|---|
| 5,113,631 | A | 5/1992 | Digirolamo et al. | |
| 5,402,612 | A * | 4/1995 | diGirolamo | E04B 1/24 52/293.3 |
| 5,870,867 | A * | 2/1999 | Mitchell | E04B 2/7457 52/270 |
| 6,073,401 | A * | 6/2000 | Iri | E04B 1/3483 52/79.9 |
| 6,481,172 | B1 * | 11/2002 | Porter | B32B 5/18 52/794.1 |
| 8,667,755 | B1 | 3/2014 | Finfrock et al. | |
| 8,733,048 | B1 * | 5/2014 | Hanson | E04B 1/16 52/348 |
| 8,826,599 | B2 * | 9/2014 | Stahl, Jr. | E04B 1/84 52/317 |
| 8,997,424 | B1 * | 4/2015 | Miller | E04B 1/08 52/656.1 |
| 2007/0209306 | A1 * | 9/2007 | Andrews | E04B 2/767 52/317 |
| 2008/0047225 | A1 * | 2/2008 | Kawai | E04B 1/08 52/796.1 |
| 2008/0295450 | A1 * | 12/2008 | Yogev | E04C 2/26 52/745.19 |
| 2010/0229472 | A1 * | 9/2010 | Malpas | E04C 2/521 52/173.3 |
| 2011/0296778 | A1 * | 12/2011 | Collins | E04C 2/521 52/745.1 |
| 2013/0326986 | A1 * | 12/2013 | Krivtsov | E04B 2/40 52/742.14 |
| 2016/0298326 | A1 * | 10/2016 | Woznuk | E04B 1/0007 |
| 2019/0048582 | A1 * | 2/2019 | Cohen | E04B 1/1909 |
| 2019/0093356 | A1 * | 3/2019 | Collins | E04C 2/521 |
| 2019/0100935 | A1 * | 4/2019 | Staszczyk | E04B 1/08 |
| 2020/0002934 | A1 * | 1/2020 | McCarron | E04B 1/2403 |

OTHER PUBLICATIONS

USPTO, International Search Report for International Patent Application No. PCT/US2021/056077, Jan. 24, 2022, 2 pages.

* cited by examiner

PRE-MANUFACTURED LOAD BEARING WALLS FOR A MULTI-STORY BUILDING

CROSS-REFERENCE TO RELATED APPLICATIONS

The present application is the U.S. national phase filing under 35 U.S.C. § 371 of International Patent Application No. PCT/US2021/056077, filed Oct. 21, 2021, which claims priority under 35 U.S.C. § 119 (e) and/or under PCT Article 8 to U.S. Provisional Patent Application No. 63/104,239, filed on Oct. 22, 2020, and entitled "LOAD BEARING WALLS FOR A BUILDING" and to U.S. Provisional Patent Application No. 63/178,515, filed on Apr. 22, 2021, and entitled "LOW-MID RISE BUILDING HAVING LOAD BEARING WALLS, UTILITY WALLS, AND A CORRIDOR SYSTEM, AND OTHER ACCOMPANYING STRUCTURE, AND METHOD TO CONSTRUCT THE BUILDING." The contents of U.S. Provisional Patent Application Nos. 63/104,239 and 63/178,515 are incorporated herein by reference in their entirety.

The present application is related in subject matter to each of the following co-pending applications, each of which shares a common filing date of Oct. 21, 2021: International Patent Application No. PCT/US2021/056091, entitled "MULTI-STORY BUILDING HAVING LOAD BEARING WALLS AND METHOD TO CONSTRUCT THE BUILDING;" International Patent Application No. PCT/US2021/056074, entitled "MULTI-STORY BUILDING HAVING PODIUM LEVEL STEEL TRANSFER STRUCTURE;" International Patent Application No. PCT/US2021/056076, entitled "PRE-MANUFACTURED FLOOR-CEILING PANEL FOR A MULTI-STORY BUILDING HAVING LOAD BEARING WALLS;" International Patent Application No. PCT/US2021/056079, entitled "PRE-MANUFACTURED UTILITY WALL FOR A MULTI-STORY BUILDING HAVING LOAD BEARING WALLS;" International Patent Application No. PCT/US2021/056080, entitled "PRE-MANUFACTURED FLOOR-CEILING CORRIDOR PANEL FOR A MULTI-STORY BUILDING HAVING LOAD BEARING WALLS;" International Patent Application No. PCT/US2021/056081, entitled "MULTI-STORY BUILDING HAVING PREFABRICATED STAIR AND ELEVATOR MODULES;" and International Patent Application No. PCT/US2021/056086, entitled "PRE-MANUFACTURED FLOOR-CEILING DRAG ANCHOR FOR A MULTI-STORY BUILDING HAVING LOAD BEARING WALLS", all of which are hereby incorporated by reference herein, in their respective entireties.

BACKGROUND

Conventional construction is typically conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

Traditional building construction continues to be more and more expensive and more and more complex. Changing codes, changing environments, and new technology have all made the construction of a building more complex than it was 10 or more years ago. In addition, trade labor availability is being reduced significantly. As more and more craftsmen retire, fewer and fewer younger workers may be choosing the construction industry as a career, leaving the construction industry largely lacking in skilled and able men and women to do the growing amount of construction work.

The construction industry is increasingly using modular construction techniques to improve efficiency. Modular construction techniques may include pre-manufacturing complete volumetric units (e.g., a stackable module) or one or more building components, such as wall panels, floor panels, and/or ceiling panels, offsite (e.g., in a factory or manufacturing facility), delivering the pre-manufactured modules or components to a building construction site, and assembling the pre-manufactured modules or components at the building construction site.

While modular construction techniques provide certain advantages over traditional construction techniques, challenges continue to exist in being able meet housing and other building demands in communities. For example, the construction industry, whether using modular construction techniques or traditional construction techniques, needs to be able to address issues such as reducing construction costs and construction waste, reducing time to build, providing building designs that efficiently use space, and other challenges brought on by increasing demands for affordable housing and other building needs.

SUMMARY

An embodiment provides a pre-manufactured load bearing wall for a multi-story building. The load bearing wall includes:

- a plurality of parallel vertical metal studs;
- a first track affixed to an upper end of the studs
- a second track affixed to a lower end of the studs;
- a first vertical support member at a first edge of the wall;
- a second vertical support member at a second edge of the wall;
- a metal plate that runs between the first and second edges of the wall, and affixed to the first and second vertical support members and to the first track, wherein the plate is configured to support a horizontal section of a first angle of a floor-ceiling panel such that the floor-ceiling panel is hung from the load bearing wall;
- a horizontal member that runs between the first and second edges of the wall, that is affixed to the lower track, and that extends laterally away from the lower track, wherein the horizontal member is configured to be affixed to second angle of the floor-ceiling panel to provide a load path for a lateral load; and
- a stiffener device located at a top end of each of the first and second vertical support members, wherein the stiffener device is configured to provide rigidity for a joint between the first and second vertical support members and corresponding vertical support members respectively positioned serially above the first and second vertical support members.

Another embodiment provides a multi-story building. The building includes:

- a pre-manufactured floor-ceiling panel; and
- a pre-manufactured load bearing wall that includes:
  - a plurality of parallel vertical metal studs;
  - a first track affixed to an upper end of the studs
  - a second track affixed to a lower end of the studs;
  - a first vertical support member at a first edge of the wall;
  - a second vertical support member at a second edge of the wall;

a metal plate that runs between the first and second edges of the wall, and affixed to the first and second vertical support members and to the first track, wherein the plate is configured to support a horizontal section of a first angle of the floor-ceiling panel such that the floor-ceiling panel is hung from the load bearing wall;

a horizontal member that runs between the first and second edges of the wall, that is affixed to the lower track, and that extends laterally away from the lower track, wherein the horizontal member is configured to be affixed to second angle of the floor-ceiling panel to provide a load path for a lateral load; and a stiffener device located at a top end of each of the first and second vertical support members, wherein the stiffener device is configured to provide rigidity for a joint between the first and second vertical support members and corresponding vertical support members respectively positioned serially above the first and second vertical support members.

Still another embodiment provides method to manufacture a load bearing wall for a multi-story building. The method includes:

affixing a first track to an upper end of a plurality of parallel vertical metal studs;

affixing a second track to a lower end of the studs;

affixing a first vertical support member to a first outer stud at a first edge of the wall;

affixing a second vertical support member to a second outer stud at a second edge of the wall;

affixing a metal plate, which runs between the first and second edges of the wall, to the first and second vertical support members and to the first track, wherein the plate is configured to support a horizontal section of a first angle of a floor-ceiling panel such that the floor-ceiling panel is hung from the load bearing wall;

affixing a horizontal member, which runs between the first and second edges of the wall, to the lower track such that the horizontal member extends laterally away from the lower track, wherein the horizontal member is configured to be affixed to second angle of the floor-ceiling panel to provide a load path for a lateral load; and placing a stiffener device at a top end of each of the first and second vertical support members, wherein the stiffener device is configured to provide rigidity for a joint between the first and second vertical support members and corresponding vertical support members respectively positioned serially above the first and second vertical support members.

DETAILED DESCRIPTION

Figure 1:
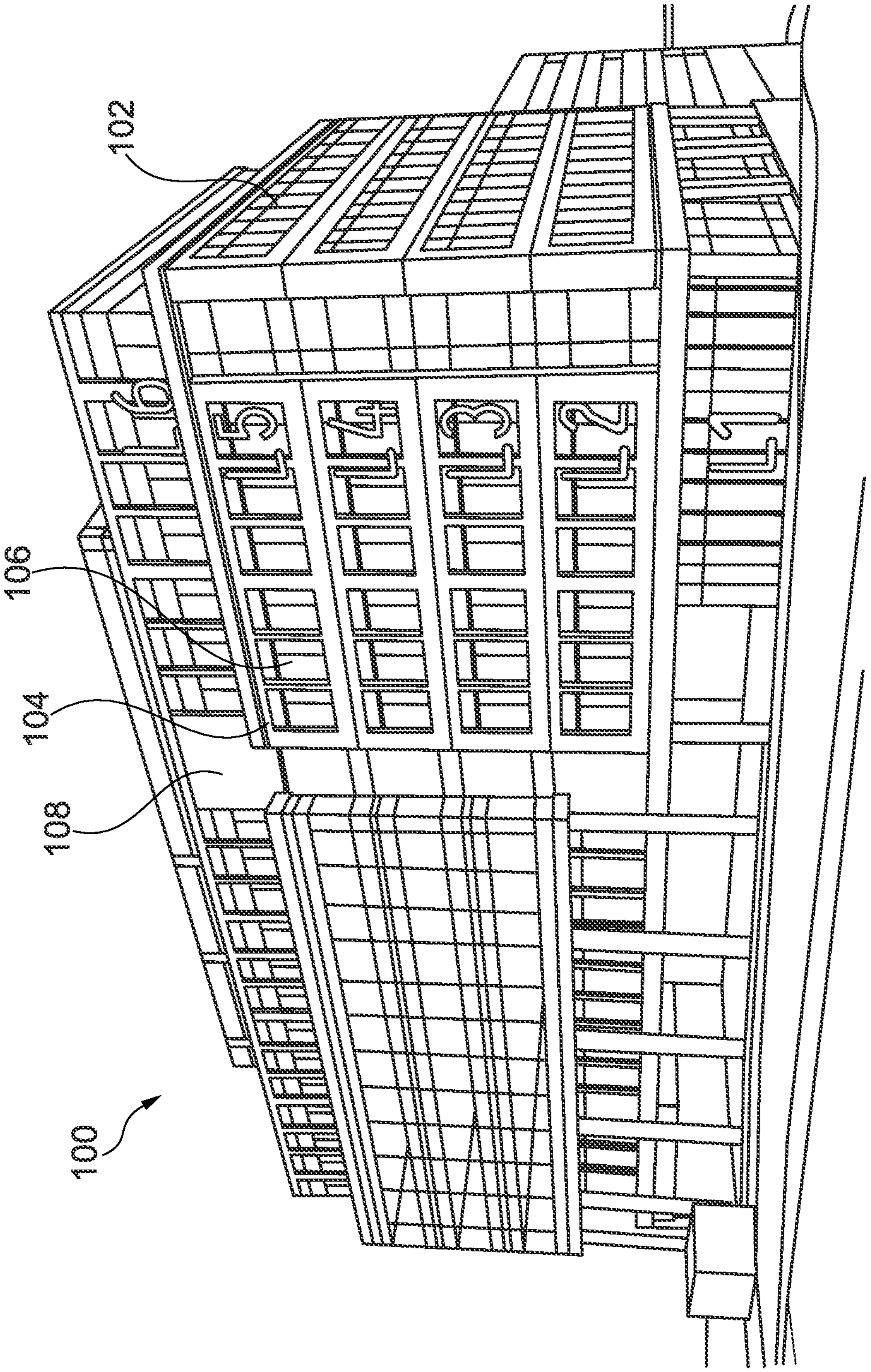
FIG. 1 is an illustration of an example multi-story building that can have pre-manufactured load bearing walls, floor-ceiling panels, and other building parts described herein, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

This disclosure is drawn, inter alia, to methods, systems, products, devices, and/or apparatuses generally related to pre-manufactured load bearing walls that may be used in multi-story buildings having other pre-manufactured building parts (e.g., floor-ceiling panels, stair and elevator modules, steel transfer structures, corridor panels, etc.), such as a low-rise or mid-rise building. The load bearing walls are structural in that they are able to absorb and/or transfer lateral and/or vertical loads.

Traditionally, buildings are constructed using a steel structural frame that is designed to resist vertical and lateral loads. Thus, the structural frame can be thought of as a skeletal structure of a multi-story building, wherein the structural frame provides structural support for the building by absorbing vertical loads due to the weight of multiple stories and lateral loads such as due to wind or earthquakes, as well as providing the framing for various walls, floors, ceilings, and other components that can be affixed to the structural frame during the course of constructing the building. However, manufacturing and assembling such a traditional and extensive structural frame can be time consuming and costly in terms of labor and material. For instance, an affordable housing crisis or other community needs may dictate that buildings with good structural integrity be built quickly and economically.

Therefore, various embodiments disclosed herein pertain to construction of a building using load bearing walls and other building parts such that the reliance upon a traditional structural frame can be reduced or eliminated, while at the same time enabling the building to meet lateral and vertical loading requirements. The load bearing walls can be pre-manufactured demising walls, end walls, or other vertical walls (including possibly utility walls), at least some of which are constructed and arranged so as to provide the structural support for the building in a manner that is sufficient to enable the building to handle vertical and lateral loads. The other building parts, such as the pre-manufactured floor-ceiling panels and corridor panels and their accompanying components, in combination with the load bearing walls and coupling linkages between them, also enhance the structural integrity for the building (e.g., for handling or transferring loads), improve acoustical performance, and increase fire safety.

The building may be a multi-story low-rise building or a multi-story mid-rise building in some embodiments. Each story of the building can include a single unit or multiple units. For instance, a particular unit may be living space, office space, retail space, storage space, or other human-occupied space or otherwise usable space in the building. In the context of living space, as an example, each story of the building may include multiple units to respectively accommodate multiple tenants.

The use of the pre-manufactured load bearing walls and other pre-manufactured parts enables the building to be constructed with a shorter time to build and at a lower cost (relative to a building that is constructed using a traditional structural frame), and without sacrificing the structural integrity of the building. Moreover, the floor-ceiling panels of the building may be made thinner relative to conventional floor-ceiling panels, thereby enabling the building to have more stories per vertical foot compared to a traditional building, or to have more open space per linear foot when relatively thinner load bearing walls are used. Thus, the building is able to provide more usable space (e.g., living space) as opposed to a traditional building that occupies the same footprint. In other cases, the thinner floor-ceiling panels provide more space between the floor and ceiling of each unit, which may be desirable for some occupants that prefer living spaces with "high ceilings."

In some embodiments, the material composition of an entire module, as well as the wall, ceiling, and floor panels, may include steel. In some embodiments, the material composition may include aluminum. In still other embodiments, the wall, ceiling, and floor panels may be made from a variety of building suitable materials ranging from metals and/or metal alloys, composites, to wood and wood polymer composites (WPC), wood based products (lignin), other organic building materials (bamboo) to organic polymers (plastics), to hybrid materials, earthen materials such as ceramics, glass mat, gypsum, fiber cement, magnesium oxide, or any other suitable materials or combinations thereof. In some embodiments, cement, grout, or other pourable or moldable building materials may also be used. In other embodiments, any combination of suitable building material may be combined by using one building material for some elements of the entire module, as well as the wall, ceiling and floor panels, and other building materials for other elements of the entire module, as well as the wall, ceiling, and floor panels. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in an entire module, as well as the wall, ceiling, and floor panels described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable (such as steel) for fabrication and/or construction of the entire module, as well as wall, ceiling, and floor panels, and/or other components thereof described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" or "grout" includes any construction grade curable composite that includes cement, water, and a granular aggregate. Granular aggregates may include sand, gravel, polymers, ash and/or other minerals.

FIG. 1 is an illustration of an example multi-story building 100 that can have pre-manufactured floor-ceiling panels, load bearing walls, and other building parts (e.g., pre-manufactured corridor panels, utility walls, window walls, and other type of walls, etc.), in accordance with some implementations. It is noted that the building 100 of FIG. 1 is being shown and described herein as an example for purposes of providing context for the various embodiments in this disclosure. The various embodiments may be provided for buildings that have a different number of stories, footprint, size, shape, configuration, appearance, etc. than those shown for the building 100.

The building 100 may be a multi-story building with one or more units (e.g., living, office, or other spaces) in each story. In the example of FIG. 1, the building 100 has six stories/levels/floors, labeled as levels L1-L6. Also as shown in FIG. 1, the building 100 has a generally rectangular footprint, although the various embodiments disclosed herein may be provided for buildings having footprints of some other shape/configuration. Moreover, each story may not necessarily have the same shape/configuration as the other stories. For instance in FIG. 1, level L6 of the building 100 has a smaller rectangular footprint relative to levels L1-L5.

The ground floor level L1 may contain living spaces, office spaces, retail spaces, storage spaces, common areas (such as a lobby), etc. or combination thereof. Levels L2-L6 may also contain living spaces, office spaces, retail spaces, storage spaces parking, storage, common areas, etc. or combination thereof. Such spaces may be defined by discrete units, separated from each other and from corridors or common areas by interior demising walls and utility walls (not shown in FIG. 1). An individual unit in turn may be made up of multiple rooms that may be defined by load bearing or non-load bearing walls. For example, a single unit on any given level may be occupied by a tenant, and may include a kitchen, living room, bathrooms, bedrooms, etc.

separated by walls, such as demising walls or utility walls. There may be multiple units (e.g., for multiple respective tenants) on each story, or only a single unit (e.g., for a single tenant) on a single story.

Each end of the building 100 includes an end wall 102. One or more panels that make up the end wall 102 may span a single story in height. Any of the sides of the building 100 may include an end wall or a window wall 104 that accommodates a window 106, such as window(s) for unit(s). One or more panels that make up the window wall 104 may span a single story in height. Some parts of the building 100 may include an end wall devoid of windows (e.g., not a window wall), such as an end wall 108, which may be comprised of a panel that spans one story of the building 100.

The unit(s) in each story may be formed using either an entire pre-manufactured module or from one or more pre-manufactured floor-ceiling panels (not shown in FIG. 1) and wall panels, and the units may also adjoin each other via hallways having pre-manufactured corridor panels used as floor-ceiling panels. A floor-ceiling panel may form the floor of a first unit and a ceiling of a second unit below the first unit, and may also be used to form part of the roof of the building 100 when used as the ceiling panel for the top floor. The pre-manufactured wall panels may be used to form interior walls (e.g., demising walls, utility walls on a corridor, etc.), window walls (e.g., exterior window wall 104 that accommodate one or more windows 106), utility walls (e.g., walls with utilities such as plumbing and electrical wiring contained therein), end walls, etc. According to various embodiments, at least some of these panels may be pre-manufactured off-site such as at a factory, and then installed on site by coupling them together to construct the building 100. The various components of such panels and how such panels are attached to each other will be described later below.

The sides of interior walls that face the interior space (e.g., living space) of the building 100 may be covered by a finish panel, such as wall paneling, for decorative and/or functional purposes. Analogously, the tops and bottoms of floor-ceiling panels that face the interior space (e.g., living space) of the building 100 may also be covered with laminate flooring, finish panels, tile, painted/textured sheathing, etc. for decorative and/or functional purposes. For exterior walls such as end walls and window walls, the sides of these walls facing the outside environment may be covered with waterproofing membranes, tiles, glass, or other material for decorative and/or functional purposes.

According to various implementations, the building 100 is constructed using load bearing walls (such as demising walls, end walls, etc.). In this manner, such walls are able to support vertical loads, and non-shear walls are able to transfer lateral loads and shear walls are able to transfer and resist lateral loads. Because these walls are load bearing components, the building 100 can eliminate or reduce the use of an extensive steel structural frame in at least some of the levels. For instance, a steel structural frame (e.g., made of an array of beams and columns to which each and every floor-ceiling panel and wall are directly attached) may be absent in levels L2-L6. A steel structural frame may be used in level L1 and/or further structural reinforcement may be given to load bearing walls that are used in level L1 alternatively or in addition to a structural frame, so as to provide structural integrity at ground level.

The building 100, having six levels L1-L6, is defined in some jurisdictions as a mid-rise building (e.g., buildings having six to 12 levels). Buildings having five levels and under are defined in some jurisdictions as a low-rise building. The various embodiments of the load bearing walls described herein may be used in low-rise and mid-rise buildings. Such low-rise and mid-rise buildings may have various fire ratings, with a 2-hour fire rating for mid-rise buildings of six stories or more and a 1-hour fire rating for buildings of five stories or less being examples for some of the buildings that use the load bearing walls described herein.

In some embodiments, the load bearing walls and other building parts described herein (in the absence of a structural frame, or with a reduced amount thereof) may be used for buildings that have a greater number of stories than a typical low-rise or mid-rise building. In such embodiments, the load bearing walls and/or other building parts described herein may be implemented with additional and/or modified structural components, so as to account for the increased load associated with the greater number of stories.

Figure 2:
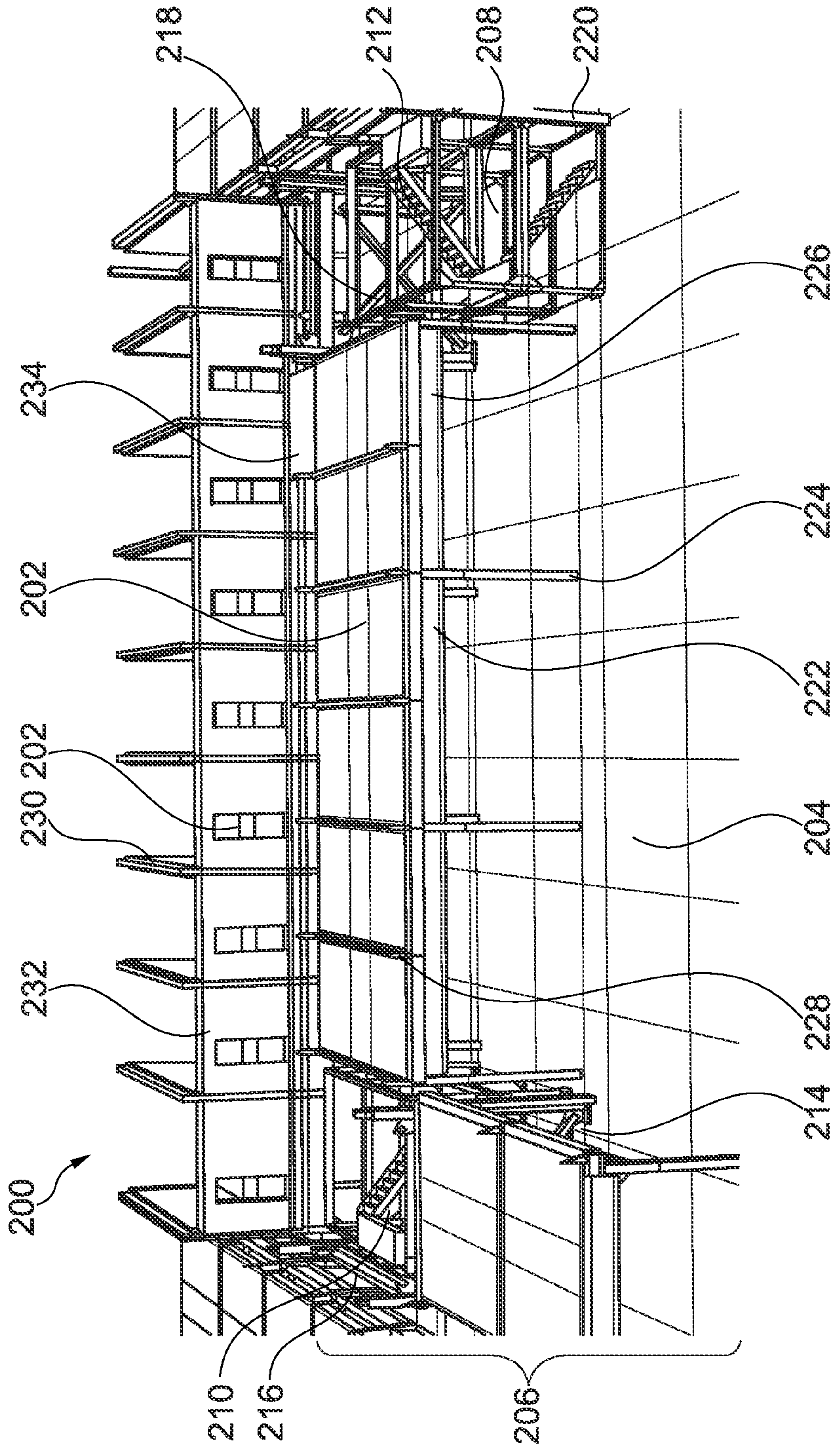
FIG. 2 shows a partially constructed building having load bearing walls and floor-ceiling panels at a second floor level of the building, in accordance with some implementations.

FIG. 2 shows a partially constructed building 200 having floor-ceiling panels 202 and load bearing walls 230 at a second floor level (L2) of the building, in accordance with some implementations. For purposes of example and illustration, the building 200 has a generally rectangular footprint, and is assumed to be a low-rise building having at most five stories (floor levels), and it is understood that the various implementations described herein may be used for buildings with other numbers of stories. A construction sequence described with respect to FIG. 2 and in the other figures that will be shown and described later may be adapted to construct buildings having other shapes, sizes, heights, configurations, number of stories, etc., such as the building 100 of FIG. 1 or any other building where load bearing walls, floor-ceiling panels, and the other building parts described herein are installed in the absence of extensive structural frames on at least some stories. In some embodiments, the various operations in the construction sequence may be performed in a different order, omitted, supplemented with other operations, modified, combined, performed in parallel, etc., relative to what is shown and described with respect to FIG. 2 and the other figures.

To describe a construction sequence to arrive at the partially constructed building 200 in FIG. 2, a foundation 204 is first formed. The foundation 204 may be a steel reinforced concrete slab that is poured on the ground to define a footprint 206 of the building 200, or may be some other type of shallow or deep foundation structure. Furthermore, excavation of the ground may also be performed to form a basement and/or elevator pit(s) 208 that form part of one or more elevator shafts to accommodate one or more elevators.

Next in the construction sequence, pre-manufactured stair and elevator modules 210 and 212 may be built on the foundation 204, and positioned such that the elevator portions of the modules 210 and 212 that will contain the elevator shaft are superimposed over the elevator pit(s) 208. The modules 210 and 212 according to various embodiments may be two stories in height, and there may be one or more of these modules per building, with two modules 210 and 212 shown by way of example in FIG. 2.

Each of the modules 210 and 212 may be comprised of vertical columns made of steel, and horizontal beams spanning between the columns and also made of steel. Thus, the columns and the beams form a structural frame, which according to various embodiments is a load bearing structure that is able to withstand vertical and lateral loads. In other embodiments, the columns may be replaced by load bearing wall panels and the beams may remain as load bearing rings.

The modules 210 and 212 of various embodiments are positioned at specific locations of the foundation 204. In the example of FIG. 2, the modules 210 and 212 are positioned on opposite sides of the building 200. Other configurations may be used, such as positioning one or more modules at a central location in the building footprint 206 or at any other suitable location(s) on the building footprint 206.

Next in the construction sequence, braced frames are installed on the foundation 204 in relation to the modules 210 and 212. For example, braced frames 214 and 216 are arranged perpendicularly around and in close proximity to the module 210, such that the module 210 is nested by the braced frames 214 and 216. With respect to the module 212, braced frames 218 and 220 are also arranged perpendicularly relative to each other but are spaced away from the module 212 by a greater distance.

The braced frames 214-220 may be arranged on the foundation 204 in any suitable location and orientation, dependent on factors such as the footprint or configuration of the building 200, source of lateral and/or vertical loads, location/orientation for optimal stabilization, etc. Any suitable number of braced frames may be provided at the ground level. The braced frames may further vary in configuration. The example of FIG. 2 depicts some brace frames (e.g., the braced frame 218) that are generally planar in shape (made of two columns and at least one horizontal beam that joins the two columns), with cross beams (X shaped beams) at the center of the braced frames. The braced frames 214-220 may span one, two, or other stories in height or intermediate heights, and multiple braced frames may also be vertically coupled.

According to various embodiments, the modules 210 and 212 are used as erection aids that guide the positioning and orientation of the braced frames 214-220 during construction. For instance, the modules 210 and 212 are installed first, and then the braced frames 214-220 are arranged relative to the location of the modules 210 and 212. The braced frames may be directly welded (or otherwise attached/connected) to the modules, or may be linked to the module(s) over a distance via linking beams or other structural framing. In this manner, the modules 210 and 212 stabilize the braced frames 214-220, and the braced frames 214-220 can operate to also absorb vertical and lateral loads from the building 200 via their linking connections.

The next phase of the construction sequence involves the erection of a steel transfer structure 222 (e.g., a podium structure) at ground level. The steel transfer structure 222 comprises a steel frame that receives and transfers load to the foundation 204 and to the braced frames 214-220. The steel transfer structure 222 may have vertical members 224 (columns) having a height that spans one story, girders 226 that join pairs of columns 224, and beams 228 that perpendicularly join pairs of girders 226. The steel transfer structure 222 may further include vertically oriented "spigots" and/or other protrusions or engagement features to aid in construction, as will be described more fully below.

After completion of the steel transfer structure 222, the next phase of the construction sequence involves the placement/installation of the floor-ceiling panels 202 over consecutive beams 228, and more specifically, hanging the floor-ceiling panels 202 onto the beams 228. A floor deck comprised of floor-ceiling panels 202 thus results after such installation.

Afterwards, the load bearing walls 230 (e.g., demising walls and end walls) are installed by being positioned over the beams 228, and utility walls 232 are then installed by being hung onto the load bearing walls 230. Next, corridor panels 234 (which may be formed similarly in some respects as the floor-ceiling panels 202) are hung from the utility walls 232.

According to the example depicted in FIG. 2, the space between consecutive beams 228 and parallel girders 226 is sized to receive three adjoining floor-ceiling panels 202, although the size of the floor-ceiling panels and the space between consecutive beams 228 and girders 226 can vary from one implementation to another. For instance, some implementations may install a multiple floor-ceiling panel between consecutive beams 228 that may vary in widths from 13 feet, to 16 feet, to 20 feet, to 24 feet, etc.

Figure 3:
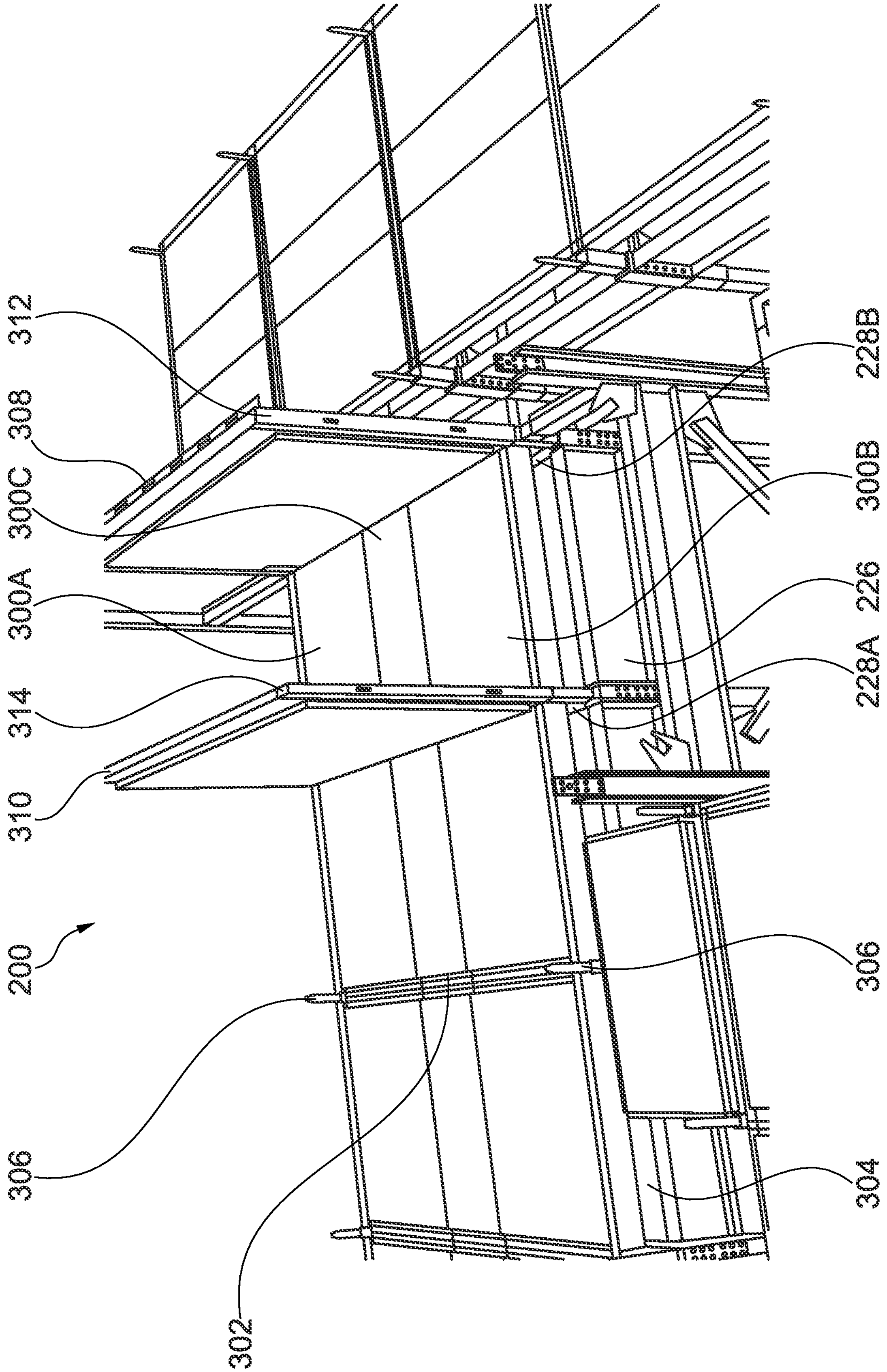
FIG. 3 shows further details of the floor-ceiling panels and load bearing walls of the partially constructed building of FIG. 2, in accordance with some implementations.

FIG. 3 shows further details of the floor-ceiling panels and load bearing walls of the partially constructed building 200 of FIG. 2. More particularly, FIG. 3 depicts the placement of three floor-ceiling panels 300A-300C (collectively 300) over and between consecutive beams 228A and 228B (collectively 228). In the example shown, the floor-ceiling panel 300A is adjacent to a window wall (not yet installed in FIG. 3) that faces an exterior of the building 200, the floor-ceiling panel 300B is adjacent to a utility wall (not yet installed in FIG. 3) that faces the interior corridor of the building 200, and the floor-ceiling panel 300C is a middle panel joined to and between the floor-ceiling panels 300A and 300B.

An installation sequence for the floor-ceiling panels may involve installing the floor-ceiling panel 300A, floor-ceiling panel 300C, and floor-ceiling panel 300B in any suitable sequence. After these three floor-ceiling panels are installed, then the installation sequence moves to the next adjacent space between consecutive beams 228 (e.g., to the left direction in FIG. 3) so as to install the next three floor-ceiling panels in the same manner. This installation sequence repeats until all floor-ceiling panels are installed on the steel transfer structure 224 in the manner as depicted in FIG. 2 to complete a floor deck for that story.

FIG. 3 shows an example mounting of floor-ceiling panels, wherein if the north-south direction along the beam 228 is considered to be a transverse direction, and if the east-west direction along the girder 226 is considered to be the longitudinal direction, then the floor-ceiling panel 300 includes an angle 302 (or other piece of metal that provides ledge-like structure) that runs along its transverse direction along an upper surface (upper corner edge) of the floor-ceiling panel 300. It is understood that the terms longitudinal and transverse are used as relative terms herein for the sake of convenience in describing perpendicular/orthogonal relationships between two components in the various embodiments, and may be swapped if the building 200 is being viewed or described from a different point of reference.

As will be shown and described in further detail below, the angle 302 includes a horizontal section that rests on a top surface of the beam 228A. A vertical section of the angle 302 is attached to a vertical edge of the floor-ceiling panel 300. A similar angle 302 is attached to the other/opposite transverse edge of the floor-ceiling panel 300, and also has a horizontal section that rests on top of a beam 228B adjacent to that edge of the floor-ceiling panel 300. In this manner, the floor-ceiling panel 300 is hung by its transverse edges between two consecutive beams 228.

With such an arrangement, the floor-ceiling panels 300 each provide a diaphragm that absorbs lateral and/or vertical load(s) and then transfers the load(s), via the angle 302, to the beams 228 of the steel transfer structure 222 and/or to other supporting structure linked to the angles 302. The steel transfer structure 222 then transfers the load(s) via one or more load paths to the foundation 204 and/or to the braced frames (e.g., the braced frames 214-220) via connecting links.

According to some embodiments, the floor-ceiling panels 300 are supported between beams 228 along their transverse sides and are unsupported (e.g., by the girders 226) along their longitudinal sides. Load bearing walls are positioned along and over the transverse sides/edges of the floor-ceiling panels 300. As depicted in FIG. 3 by way of example and as will be described in further detail below, an end wall 308 (or a demising wall) may be positioned over/along a first transverse side/edge of the floor-ceiling panel 300, and a demising wall 310 (or an end wall) may be positioned over/along a second transverse side/edge (opposite from the first transverse side/edge) of the floor-ceiling panel 300.

Both of the walls 308 and 310 are load bearing walls. The end wall 308 is also a shear wall (but may not be a shear wall in some situations), and the demising wall 310 may or may not be a shear wall. In general, various structural configurations may be used to enable a wall to be a shear wall so as to resist in-plane shear and overturning. For example, stronger stud configurations or wall material may be used, as well as more dense screw patterns for attaching metal sheets to the walls and augmentation of vertical connections between panels at end studs (tubular members).

FIG. 3 also depicts alignment/placement and securing of the walls, using spigots 306 or other type of engagement/alignment feature. More particularly, the end wall 308 and the demising wall 310 are installed by initially positioning these walls over/above the beams 228, and then lowering these walls so that they rest upon the beams 228.

In the example of FIG. 3, the end wall 308 may include a tubular member 312, such as a hollow structural section (HSS) tube, or other type of vertical support member affixed along both of its vertical proximal and distal edges. As the end wall 308 is being lowered into position, the spigots 306 (located adjacent to both ends of the beam 228) are inserted into the openings of the lower ends of the tubular members 312. The end wall 308 is then secured in place by tightening the attachment bolts on the spigot 306 and by affixing a lower edge of the end wall 308 to the upper surface of the floor-ceiling panels, which will be shown and described in further detail below with respect to FIG. 5.

A similar procedure may be used to install the demising wall 310, by fitting openings (at lower ends of vertical tubular members 314 located at the vertical proximal and distal edges of the demising wall 310) over and around the spigots 306. A result of this installation is shown in FIG. 3, wherein two parallel walls are now standing in a self-aligned and self-supported manner, without the need for additional bracing from structural framing (e.g., an internal framing/skeleton of the building 200).

After the floor-ceiling panels, walls, and corridor panels are finished being installed on the second floor level L2, then the construction sequence described with respect to FIGS. 2 and 3 repeats for each subsequent floor level above. For example, FIG. 4 shows installation of a floor-ceiling panel 400 on a next floor level of the building 200, which in this example is the third floor level L3.

Figure 4:
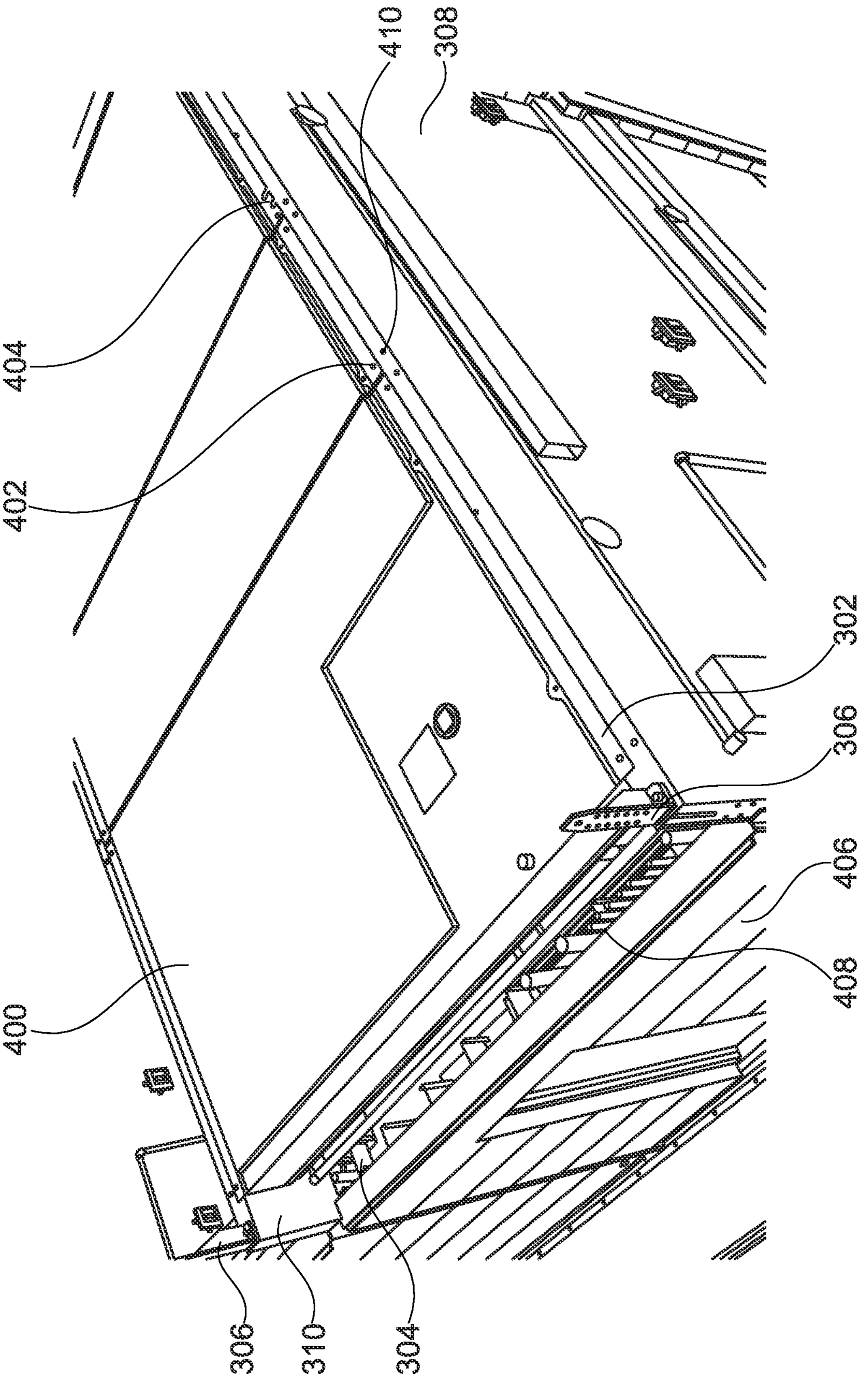
FIG. 4 shows installation of a floor-ceiling panel onto load bearing walls for a next floor level of the building, in accordance with some implementations.

In FIG. 4, the floor-ceiling panel 400 is hung onto the previously installed end wall 308 and demising wall 310, via the angles 302 that run along the transverse upper edges of the floor-ceiling panel 400. The floor-ceiling panel 400 is hung by resting the horizontal sections of the angles 302 on the top surfaces of the end wall 308 and demising wall 310. The manner in which the floor-ceiling panel 400 of FIG. 4 is hung from the top surfaces of the end wall 308 and the demising wall 310, via the angles 302, may be generally similar to the manner that the floor-ceiling panels 300 are hung from the top surfaces of the beams 228 in FIG. 3.

Holes 402 may be formed (e.g., offsite at the factory) in the angles 302 of the floor-ceiling panel 400. During installation, such holes 402 may be superimposed over holes 410 formed at the upper surfaces of the walls 308/310, so as to facilitate the alignment and positioning of the floor-ceiling panel 400 with some precision. For instance, temporary pegs or screws may be inserted into the holes 402 and 410 during installation to align and hold the floor-ceiling panel 400 in place, while the angle 302 is screwed, bolted, or welded to a top plate on the top surfaces of the walls 308 and 310.

Moreover, further spigots 306 may be installed on top of the walls 308 and 310, for alignment and securing of the upper end wall and demising wall that will be installed next on top of the respective lower end wall 308 and demising wall 310. The angle 302 may have cutouts 404 to accommodate fasteners (e.g., bolts) for a mounting base of spigots 306 and/or to accommodate other parts or fasteners.

FIG. 4 also shows an installed utility wall 406 (e.g., the utility wall 232 shown in FIG. 2), with the floor-ceiling panel 400 being sized and installed such that the gap 304 is provided to accommodate a next utility wall above the utility wall 406. The gap 304 may be absent in other embodiments. FIG. 4 further shows that the gap 304 accommodates utilities 408 (e.g., plumbing, electrical, etc.) that are pre-installed in the utility wall 406. As will be described further below, the load bearing walls 308/310 may be constructed such that the utility wall 406 is hung from these load bearing walls.

Figure 5:
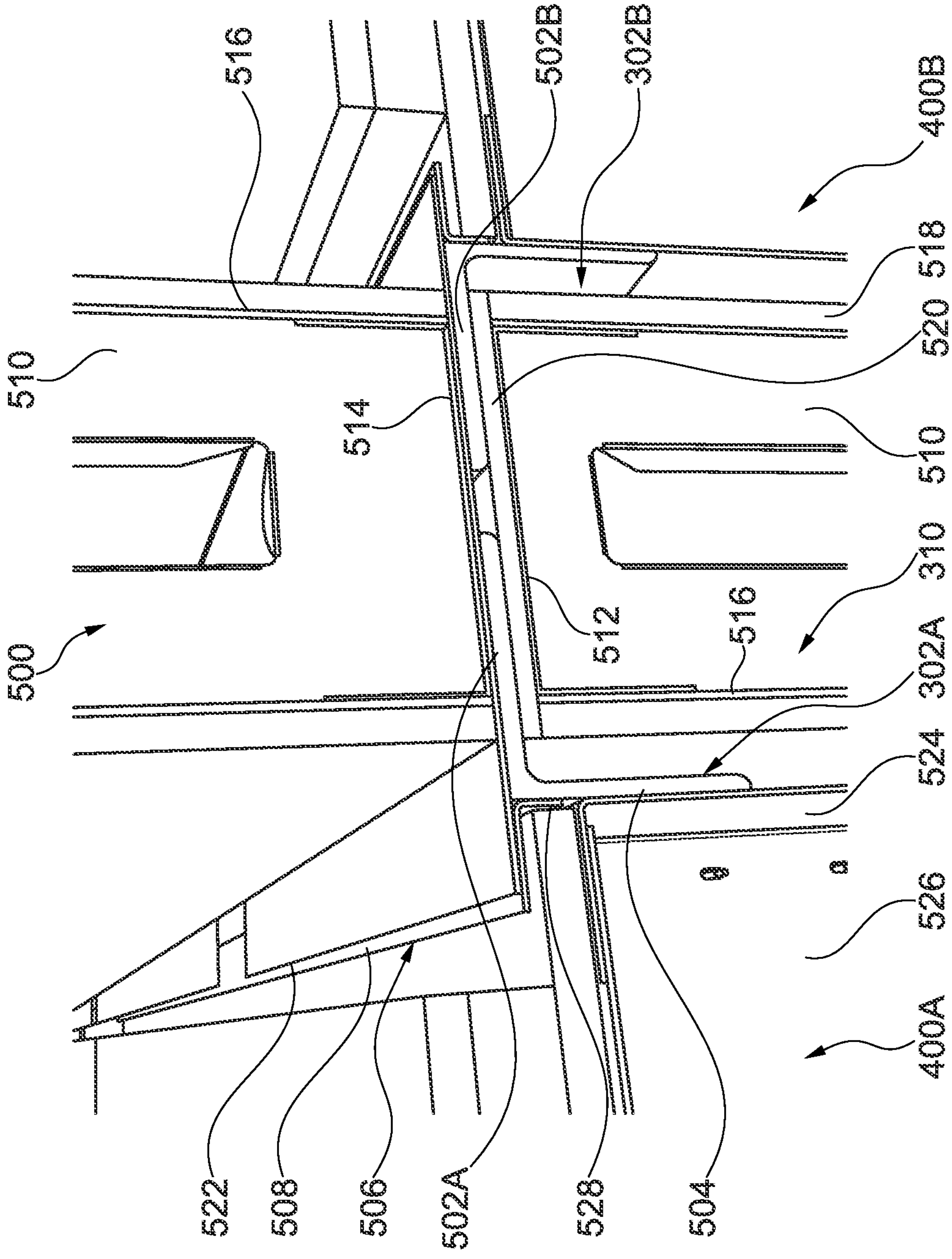
FIG. 5 is a cutaway view that shows some of the components of load bearing walls in more detail, in accordance with some implementations.

FIG. 5 is a cutaway (or cross-sectional) view that shows some of the components of load bearing walls (e.g., demising walls such as the demising walls 310) in more detail, in accordance with some implementations. More specifically, FIG. 5 shows a top portion of a load bearing wall (e.g., the demising wall 310) and the bottom portion of a demising wall 500 that is positioned (on the next floor level) above the demising wall 310. The top portions of both walls are the same/similar for both walls and the bottom portions of both walls are the same/similar for both walls, and so these walls will be described interchangeably herein.

The interior of each wall includes vertical parallel metal studs 510 along the entire length of the walls. The studs may be spaced at 18" on center (e.g., their centers are 18 inches apart), 16" on center, or some other spacing. Traditional studs are spaced at 24 inches on center, and so the reduced spacing distance between the studs 510 enables more studs to be present per linear foot of the length of the wall, thereby providing the wall with increased capability to support a vertical load.

According to some embodiments, each individual stud 510 may be formed from one or more vertically arranged C-channels having example dimensions of about 2 inches by 6 inches nominally, or 3⅝ inches by 1⅝ inches, with a 12 gauge, 14 gauge, or 16 gauge thickness (or other thinner or thicker gauge). One or more horizontally arranged C-channels may provide an upper track 512 (first track) attached/affixed to the upper ends of the studs 510, and a lower track 514 (second track) attached/affixed to the lower ends of the studs 510. The tracks 512/514 may be 14 gauge or other gauge/thickness of steel.

Each of the walls 310/500 may include a metal layer 516 on both sides of each wall 310/500, such as sheet of metal made of 20 gauge steel or other steel gauge/thickness. The metal layer 516 covers the internal structure and other parts of the walls (such as the studs 510, utilities, insulation, etc. in the interior of the walls, not shown in FIG. 5), and may be affixed to the studs 510 or tracks 512/514 by screws or other fasteners, welding, adhesives, etc. A layer 518 may overlie each respective metal layer 516, and may comprise a gypsum board, a finish panel, etc.

A horizontal metal plate 520 may be affixed on top of the upper track 512, and may run along the entire length of the upper edge of the lower wall 310 or along a portion thereof. The metal plate 520 may be steel, for example, that is about 7 inches wide and ¼ inches thick. The metal plate 520 may be affixed (offsite at a factory) to the upper track 512 via screws or bolts or other fasteners, by welding to the upper track 512 and/or to the metal layer 516, or by some other attachment method.

The lower portion of each wall 310/500 has an affixed horizontal member 522 (e.g., welded to the lower track 514 and/or to the metal layer 516, bolted or screwed to the lower track 514, etc., which may be performed offsite at a factory). The horizontal member 522 may run along an entire length of the lower track 514 (e.g., runs along the full length between the proximal and distal ends of the wall 500), or may run intermittently in sections along the lower track 514, such as depicted in the example of FIG. 5. The horizontal member 522 extends laterally away from the lower track.

According to various implementations, the horizontal member 522 may be made from 14 gauge steel, or ¼ inch steel, or some other steel gauge or thickness. The horizontal member 522 may be 12 inches wide or other dimension. It is understood that the foregoing various dimensions (as well as for various other components described throughout this disclosure), such as thicknesses, gauges, lengths, widths, heights, etc. are for illustrative purposes, and that such dimensions may vary from one implementation to another depending on factors such as material availability, cost considerations, structural performance requirements (including loading and weight requirements), design variations, etc.

A floor-ceiling panel 400A and an adjacent floor-ceiling panel 400B (collectively 400) are hung onto a load bearing demising wall (e.g., the demising wall 310 of FIG. 5), via the respective horizontal sections 502A and 502B (collectively 502) of the angles 302A and 302B (collectively 302) of the respective floor-ceiling panels 400A and 400B.

The angle 302 (e.g., an L-shaped member such as a hot-rolled metal angle or other type of load carrying/bearing angle) is positioned over and rests on the plate 520 serving as a head plate at the top of the wall 310. The angle 302 (first angle) includes, in addition to the horizontal section (flange) 502, a vertical section (flange) 504.

The floor-ceiling panel 400 further includes a shear angle 506 (which may also be a cold formed metal angle of 14 gauge, for example) that runs along each of the transverse upper edges/corners of the floor-ceiling panel 400. The shear angle 506 (a second angle) has a horizontal section 508 and a vertical section 528. The horizontal section 508 of the shear angle 506 lies on top of and may be attached to an upper surface of the floor-ceiling panel 400. The angle 302 may be ¼ inch steel, with vertical and horizontal sections of lengths between 2-6 inches, for example. The shear angle 506 may be the same dimensions as the angle 302, or may be made of relatively thinner (or thicker) steel with horizontal/vertical sections that are shorter (or longer) relative to the angle 302.

During offsite manufacturing, the vertical section 528 of the shear angle 506 is welded to the vertical section 504 of the angle 302 (such as via a continuous weld or a stitch weld) at the upper edge of the vertical section 528. The vertical section 504 of the angle 302 is then welded (such as via a continuous weld or a stitch weld), during the off-site manufacturing, to an end member 524 (such as a track in the form of a C-channel) attached to the ends of longitudinally running parallel metal joists 526 of the floor-ceiling panel 400.

Welding or otherwise attaching the vertical section 504 of the angle 302 to the floor-ceiling panel 400 enables the angle 302, after being hung to the wall 310 during the construction sequence, to support the vertical load of the floor-ceiling panel 400. The horizontal section 508 of the shear angle 506 in combination with the angle 302 also provides a load path to enable lateral load to be transferred from the diaphragm, formed by the floor-ceiling panel 400, to the plate 500 and then to load path(s) or connecting links to the braced frames, etc.

This arrangement of the shear angle 506 and the angle 302 thus forms a T-shaped element that each run transversely along the entire length of the upper corner edges of the floor-ceiling panel 400. While the examples are described herein of the shear angle 506 and the angle 302 (both made of metal such as steel) being separate pieces that are attached to each other, some embodiments may use a single integrated piece of metal that is T-shaped.

During the construction sequence and after the floor-ceiling panels 400 are hung from the wall 310, the wall 500 is lowered aligned/positioned into place (e.g., using the spigots 306 as previously explained above), and then the horizontal member 522 is affixed to the each of the horizontal sections 508 of the shear angles 506 of the floor-ceiling panels 400, thereby permanently mounting the upper load bearing wall 500 over the lower load bearing wall 310. The horizontal section 508 thus forms a landing/fastening location for the horizontal member 522. The horizontal member 522 may be affixed to the shear angle 506 such as by screwing, by stitch or continuous welding the horizontal member 522 to the horizontal section 508, or by bolting or other attachment technique.

Affixing the load bearing upper wall 500 to the floor-ceiling panels 400 in this manner enables lateral load to transfer from the upper wall 500 to the horizontal member 522, and then to the shear angle 506 and/or the angle 302. The lateral load can then transfer across the diaphragm formed by the floor-ceiling panel 400 (e.g., via the sheets of steel in the floor-ceiling panel 400) and then to linking connections with further load bearing walls (e.g., via other angles 502/506 and plates 500), other floor-ceiling panels, corridor panels, and through various other linking elements and other possible load paths, and then to resisting elements such as the braced frames, designated shear walls, etc. For example, in the case that the depicted walls are shear walls, lateral forces may follow the path 500 to 522 to 506/302 to 520, and down to wall 310, thereby transmitting collected lateral force from the diaphragm down the shear wall to the steel transfer structure at ground level and into the foundation. These lateral forces may include forces from non-shear bearing walls that are transmitted into the diaphragm by the same connection detail (as described).

Figure 6:
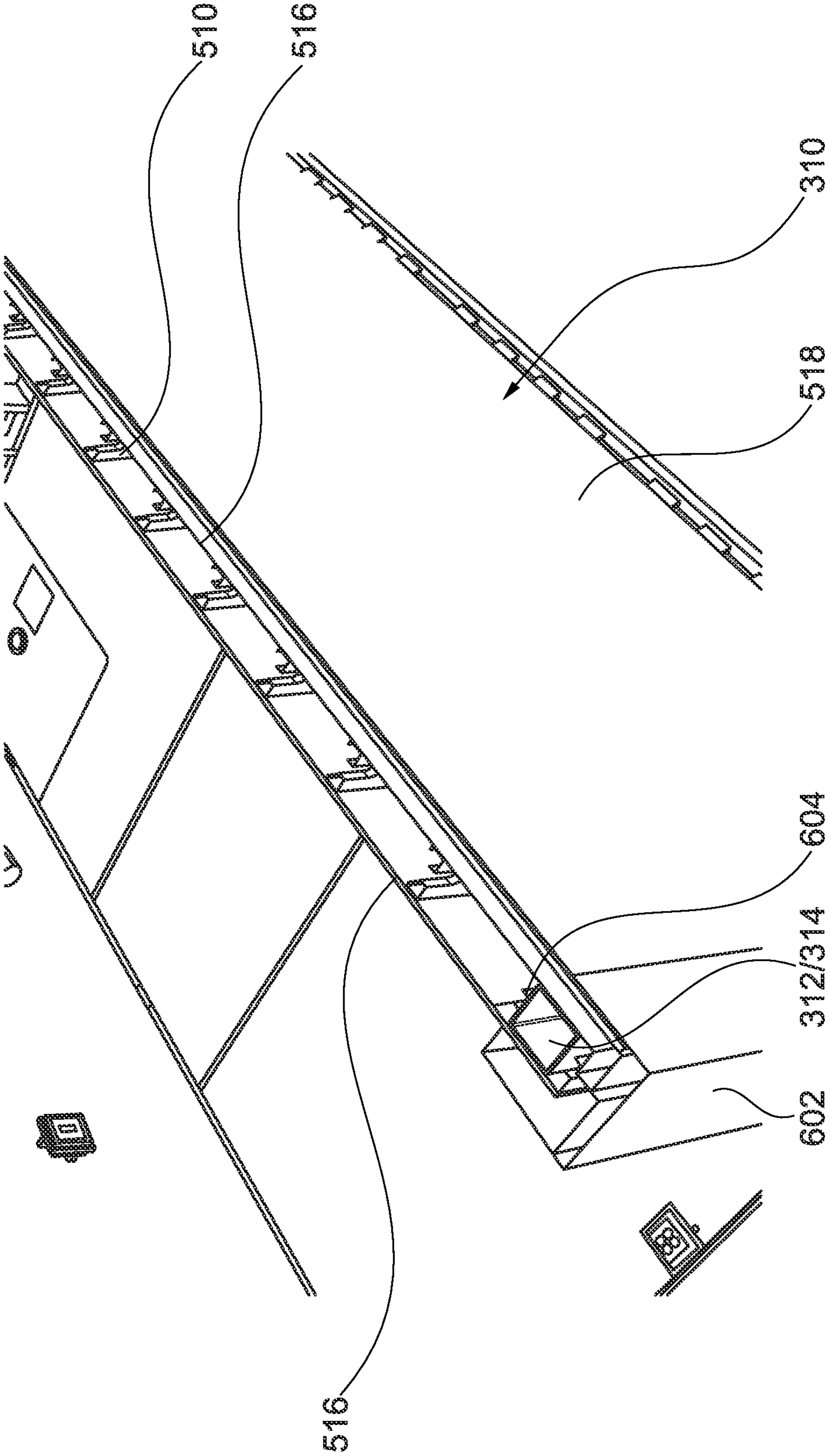
FIG. 6 is a cutaway view of a load bearing wall, in accordance with some implementations.

FIG. 6 is a cutaway view of a load bearing wall (e.g., one of the demising walls 310 of FIG. 3 or 500 in FIG. 5), in accordance with some implementations. The upper track 512 and the plate 520 have been cut away from FIG. 6, for further clarity. The wall 310 is shown in FIG. 6 as being erected, in a generally similar manner as shown in FIG. 3 and the other figures.

The studs 510 are shown, with the metal layers 516 respectively attached to both sides of the studs 510. Other parts of (or attachments) to the wall 310, such as the layers 518 and a facia 602, are also shown in FIG. 6 for context.

According to various embodiments, the load bearing wall (e.g., the demising wall 310 or the end wall 308) includes a vertically running tubular member 312 (also shown in FIG. 3 and which may also be a similar/same type of part as the tubular member 314) at both the proximal end and the distal end of the wall 310. The tubular member 312 may be, for example, a single HSS tube having dimensions of 6 inches by 6 inches by ¼ inch thick. HSS tubes of other dimensions may be used for the tubular member 312, including bundles of two or more HSS tubes that are attached (e.g., by welding) together.

In other implementations, two or more C-channels, I-beams, box beams, or other type of elongated vertical support member may be bundled together to provide the structural support analogous to that provided by the HSS tube shown in FIG. 6, at the proximal and distal ends of the wall 310. Such other type of support member also may not necessarily be tubular in form, individually and/or after being bundled together. For the sake of explanation, the various embodiments herein will describe the vertical support member at the proximal and distal ends of the wall as being the tubular member 312 (and similarly the tubular member 314) such as an HSS tube.

The tubular member 312 is attached, offsite at a factory, to an outer stud 604. This attachment may be done by welding together the tubular member 312 and the outer stud 604, or via the use of fasteners such as bolts/nuts or screws.

Figure 7:
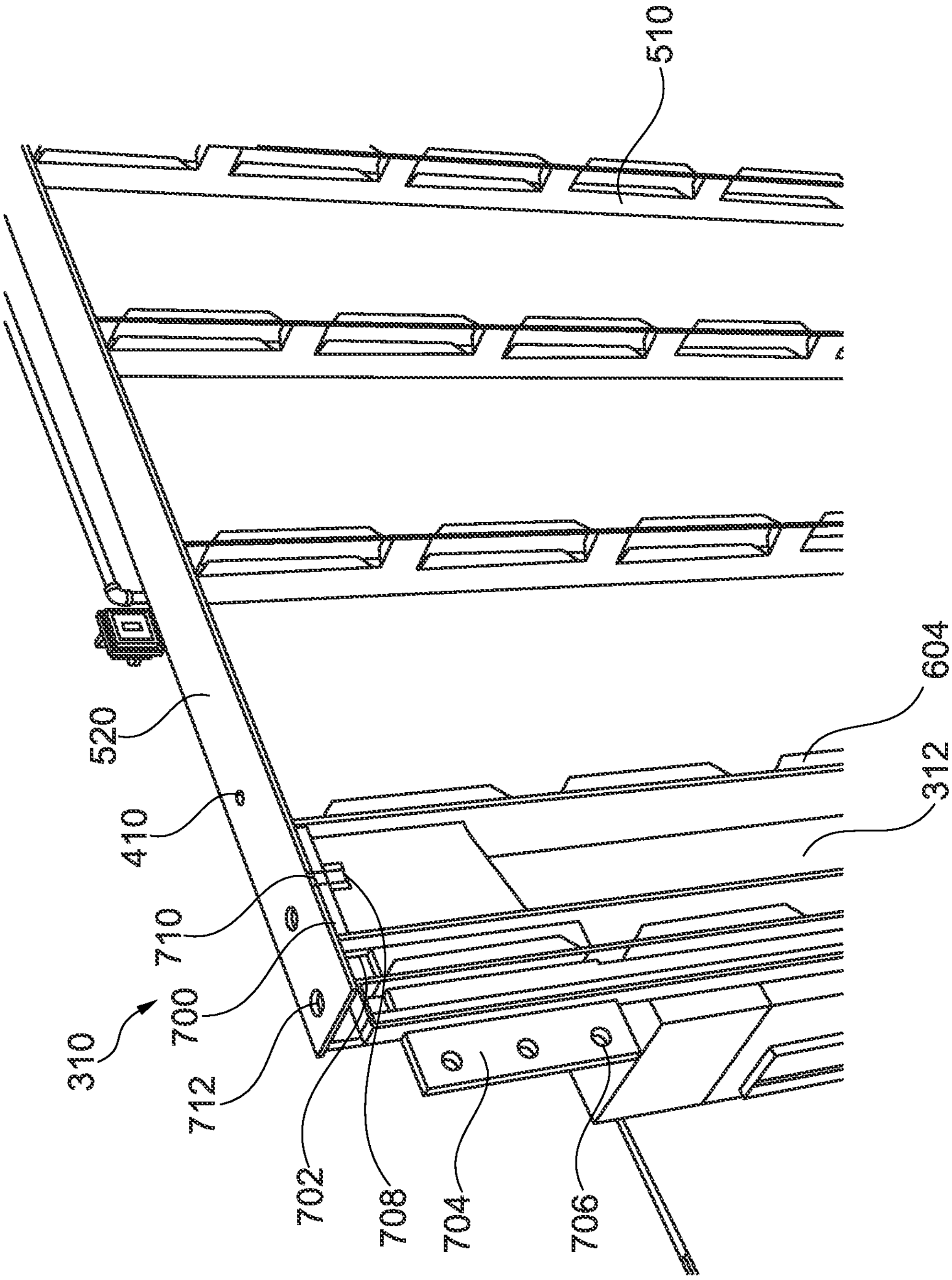
FIG. 7 is another cutaway view of a load bearing wall, in accordance with some implementations.

FIG. 7 is another cutaway view of a load bearing wall (e.g., the demising wall 310 of FIG. 6), in accordance with some implementations. In this view, the plate 520 is now shown as being attached to the upper portion of the wall 310. Also shown are the hole(s) 410 (described with respect to FIG. 4 above) that run through the plate 520, and which is a temporary construction fastening hole for use with a corresponding hole in the angle 302. The connection at 410 holds floor-ceiling panel in place for precision and safety during building erection. This fastening also creates a tight joint for weld setup.

The tubular member 312 includes a cap 700 that is sized and shaped to cover the top opening of the tubular member 312. The cap 700 may be the same thickness as the walls of the tubular member 312 (e.g., ¼ inches thick), or may be thinner or thicker.

A vertical slot 702 may be formed at the upper end of the tubular member 312, which is sized and shaped to accommodate a protrusion 704. The protrusion 704 may be oriented in a vertical direction, so as to be orthogonal/perpendicular to the cap 700 that is oriented in a horizontal direction. The protrusion 704 may pass through the slot 702, so as to have a length that extends at least up to the outer surface of the tubular member 312. In the example of FIG. 4, the protrusion 704 extends past the slot 702 by a sufficient distance so as to form a flag-like structure.

According to various embodiments, the protrusion 704 in combination with the cap 700 operate as a stiffener device for the upper end of the tubular member 312, such as for resisting seismic overturning loads when the wall is a shear wall. In implementations wherein the extended flag-like structure of the protrusion 704 is present, holes 706 may be provided in the protrusion 706 for coupling (e.g., via bolts) to other structural elements, such as a structural link across a corridor, framing for a balcony, or other structure, for purposes of connection and providing a load path for shear or vertical loads.

In some embodiments, the protrusion 704 and the cap 700 may be formed from a single piece of metal that is vertically inserted into the opening of the tubular member 312. In other embodiments, the protrusion 704 and the cap 700 may be separate pieces of metal that are joined together (e.g., by welding off site at a factory) and then vertically inserted into the opening of the tubular member 312. Once inserted into place, the plate 520 is then installed (e.g., by welding or fasteners) over both the upper track 512 and the cap 700.

In some embodiments, the cap 700 and/or the protrusion 704 may be welded to outer surfaces of the tubular member 312, prior to attachment of the plate 520, so as to hold the cap 700 and protrusion 700 in place. In other embodiments the cap 700 (with the protrusion 704 attached thereto) may be loose-fitted over the opening of the tubular member 312 and into the slot 704, and then held in place when the overlying plate 520 is fixedly attached to the upper surface of the wall 310.

Still further, an underside of the cap 700 may be provided with a captive fastener (such as a captive nut 708) to receive a bolt (not shown in FIG. 7) that is passed through a hole 710 that runs through the plate 520 and cap 700. Such a bolt may, for example, serve to attach a spigot 306 to the plate 520 in a manner that will be described next below, and at the same time, to also firmly hold the cap 700 in place against the plate 502 and the spigot 306. This bolt connection in conjunction with connections at the protrusion 706 allows the plate 520 (and by extension the end wall) to be used as a linking member to transfer lateral forces. Other holes 712 may be formed in the plate 520 to receive bolts for the spigot 306 and/or for connection of other parts and/or for alignment.

Figure 8:
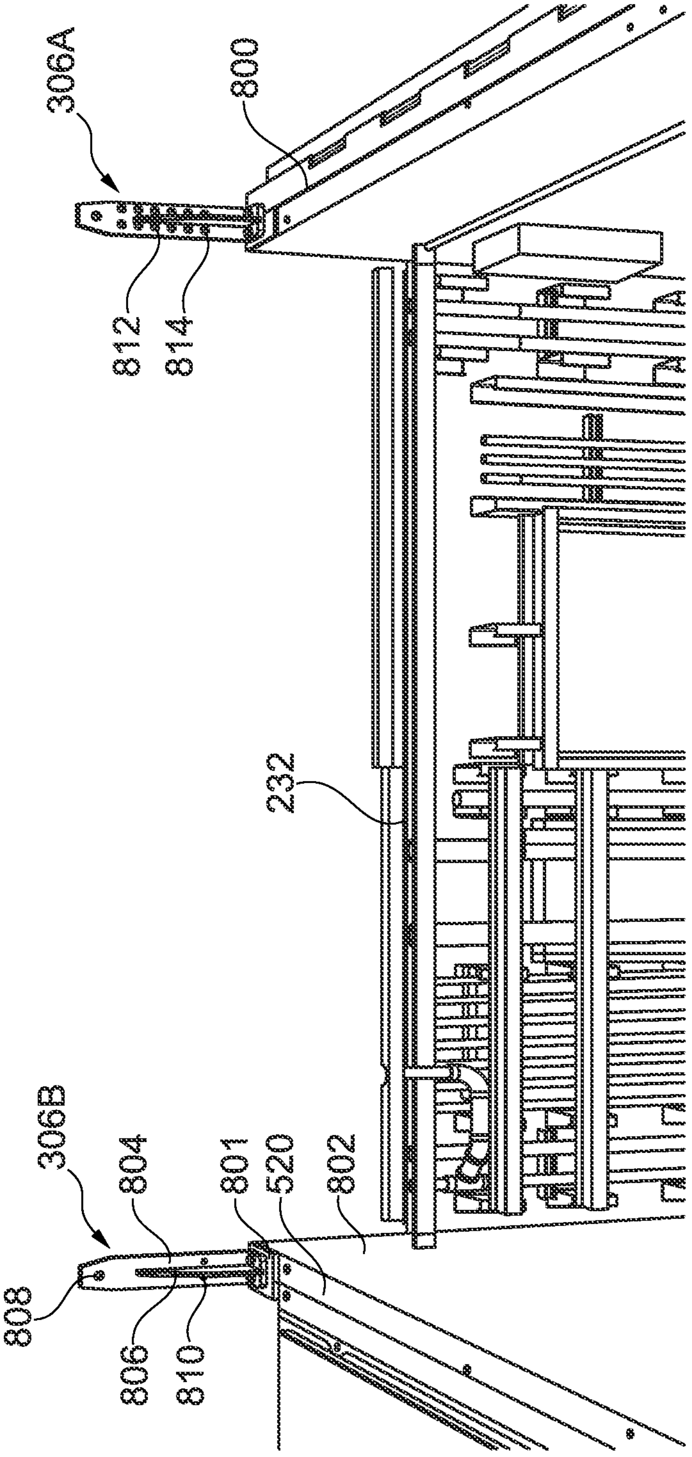
FIG. 8 shows load bearing walls with spigots installed thereon, in accordance with some implementations.

FIG. 8 shows load bearing walls with spigots 306 installed thereon, in accordance with some implementations. For example, load bearing walls are erected in FIG. 8, and may include an end wall 800 (similar to the end wall 308) and a demising wall 802 (similar to the demising wall 310). A utility wall 232 is hung from the end wall 800 and the demising wall 802.

Respective spigots 306A and 306B (collectively 306) are shaped and sized to fit inside tubular members 312/314 (shown in FIG. 3) of the load bearing walls, and are shown in FIG. 8 as being installed on top of the walls 800 and 802, so that the next (upper walls) can be fitted over the spigots 306. Each spigot 306 includes a horizontal mounting base 801 (engaged, over the plate 520 of the wall and a shim, with the plate 700 via a nut at hole 710 in FIG. 7), a vertical attachment section 804 that is orthogonal to the mounting base 801, and a vertical bracket 806 that is orthogonal to the attachment section 804. The bracket 806, in combination with the attachment section 804 and the mounting base 801, provide rigidity to enable each spigot 306 to operate as a type of anchor point to stabilize and align a next upper load bearing wall, when the tubular member 312/314 of that wall is inserted over and around the spigot 306. For example, the spigots 306 attached via the attachment section 804 to the proximal and distal ends of an upper load bearing wall prevent in-plane shear and overturning of that load bearing wall, after that load bearing wall is firmly affixed over the spigots 306. In some implementations, the bracket 810 may not be present in some spigots 306, for example if the wall that overlies the spigot is expected to be subject to relatively weaker loads, and so less robust bracing of the spigot is needed.

The attachment section 804 of the spigot 306 further includes at least one alignment hole 808 to align with a respective hole in the tubular member 312/314 of a wall that will be installed over the spigot 306 and over the previously erected lower wall below, plus a plurality of holes 810 to receive bolts for securing that upper wall to the spigot 306. Where the wall is a non-shear demising wall or other type of non-shear wall that may not experience significant shear forces (such as another demising wall positioned above the demising wall 802), the spigot 306B may be provided with a relatively smaller number of holes 810 to receive bolts that secure that upper wall to the spigot 306B. Where the wall is an end wall or other type of wall that may experience significant shear forces (such as another end wall positioned above the end wall 800), the spigot 306A may be provided with a relatively higher number of holes 812 to receive bolts that secure that upper wall to the spigot 306A. The higher number of holes correspond to a higher number of bolts to provide rigidity/strength to ensure that the wall does not twist or overturn when subjected to load, including shear forces. For the holes 810 and 812, the spigots 306 may be provided with captive nuts 814, since the nut-side of the holes may be inaccessible after the tubular members 312/314 of the upper walls are lowered over the spigots 306.

Figure 9:
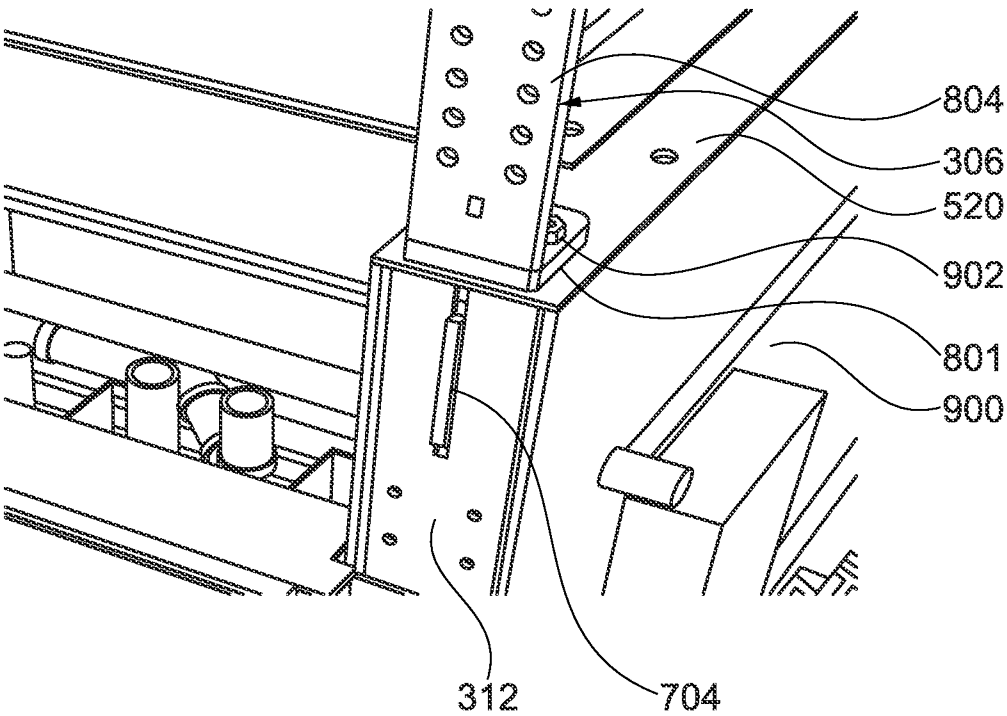
FIGS. 9 and 10 show examples of protrusions for tubular members of load bearing walls and spigots attached to the tubular members, in accordance with some implementations.
Figure 10:
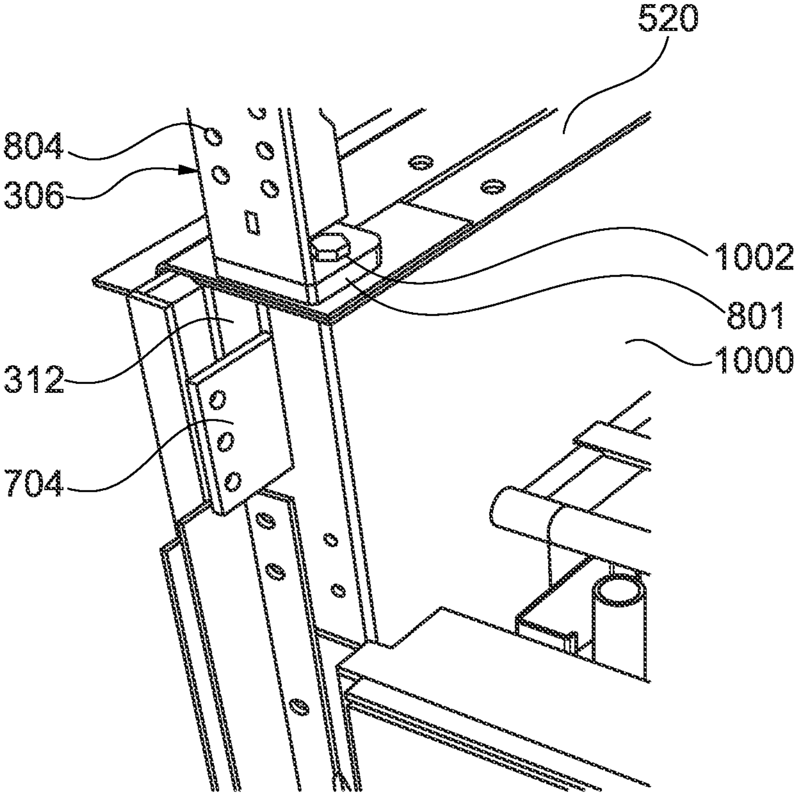

FIGS. 9 and 10 show examples of protrusions 704 for tubular members of load bearing walls and spigots 306 attached to the tubular members, in accordance with some implementations. Such protrusions 704 were previously discussed above with respect to FIG. 7.

In the implementation of FIG. 9, the protrusion 704 for a load bearing wall 900 does not significantly extend past the outer surface of the tubular member 312. This implementation may be used, for example, The stiffener plate shown in FIG. 9 may be implemented specifically where a demising wall is designed to act as a shear wall and the tube at each end of the wall encounters higher axial seismic overturning loads consistent with the use of a spigot type such as shown at spigot 306A in FIG. 8. In cases of a demising wall subject to lower loading (non-shear load bearing wall), the protrusion 704 as a stiffener may be omitted completely.

FIG. 9 further shows the spigot 306 having its mounting base 801 attached, via bolt 902, through the plate 520 of the wall 900 to the plate 700. The parts of the wall 900 that enable this attachment were described above with respect to FIG. 7, and will be further described in FIG. 12. The parts of a load bearing wall (not shown in FIG. 9) above the wall 900 that will enable attachment of that upper wall to the attachment section 804 of the spigot 306 will be further described in FIGS. 11 and 12.

FIG. 10 is analogous to FIG. 9, except that the protrusion 704 extends a further distance from the surface of the tubular member 312 of a wall 1000, thereby forming a flag-like structure. The flag-like structure of the protrusion 704 may thus be used to connect to other structural links, for purposes of carrying and transferring load, providing structural continuity and support, etc. As with FIG. 9, a bolt 1002 may be used to affix the mounting base 801 of the spigot 306 to the plate 520 of the wall 1000.

Figure 11:
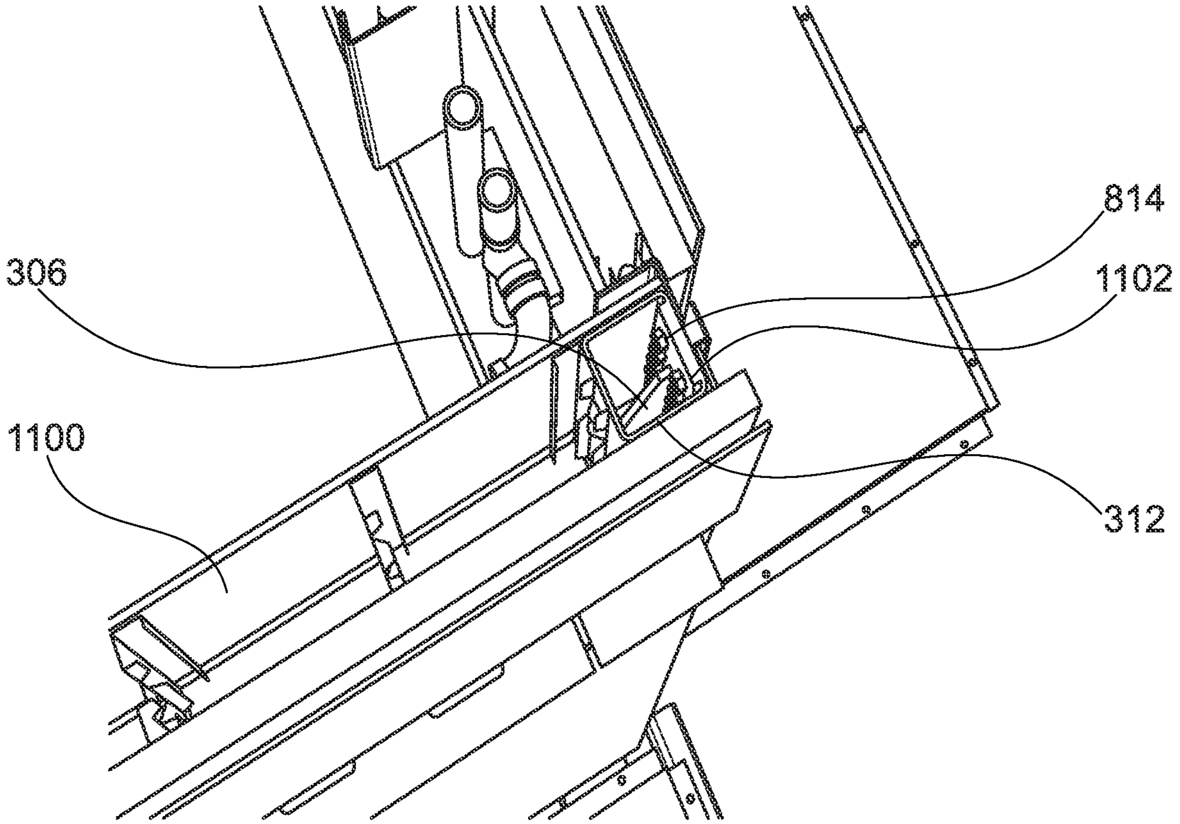
FIG. 11 is a cutaway view showing parts of a load bearing wall that may be attached to a spigot, in accordance with various implementations.

FIG. 11 is a top cutaway view showing parts of a load bearing wall 1100 that may be attached to a spigot, in accordance with various implementations. More specifically, an upper load bearing wall 1100 (generally structured in the similar/same manner as the other load bearing walls previously described above), such as an end wall, has been lowered into place over a lower load bearing wall, such that the spigot 306 has been inserted into the tubular member 312 of the wall 1100.

As shown in FIG. 11, the inside of the tubular member 312 has a generally rectangular profile that is sized and shaped to accommodate a generally rectangular footprint/profile of the spigot 306. Furthermore, one side of the tubular member 312 has holes at location 1102 to enable bolts (not shown) to be inserted through these holes so as to engage the captive nuts 814 of the spigot 306. This engagement of the bolts with the captive nuts 814 enables the spigot 306 (present on both proximal and distal ends of the wall 1100) to align and secure the wall 1100, including stabilizing the wall 1100 against twisting and overturn.

Figure 12:
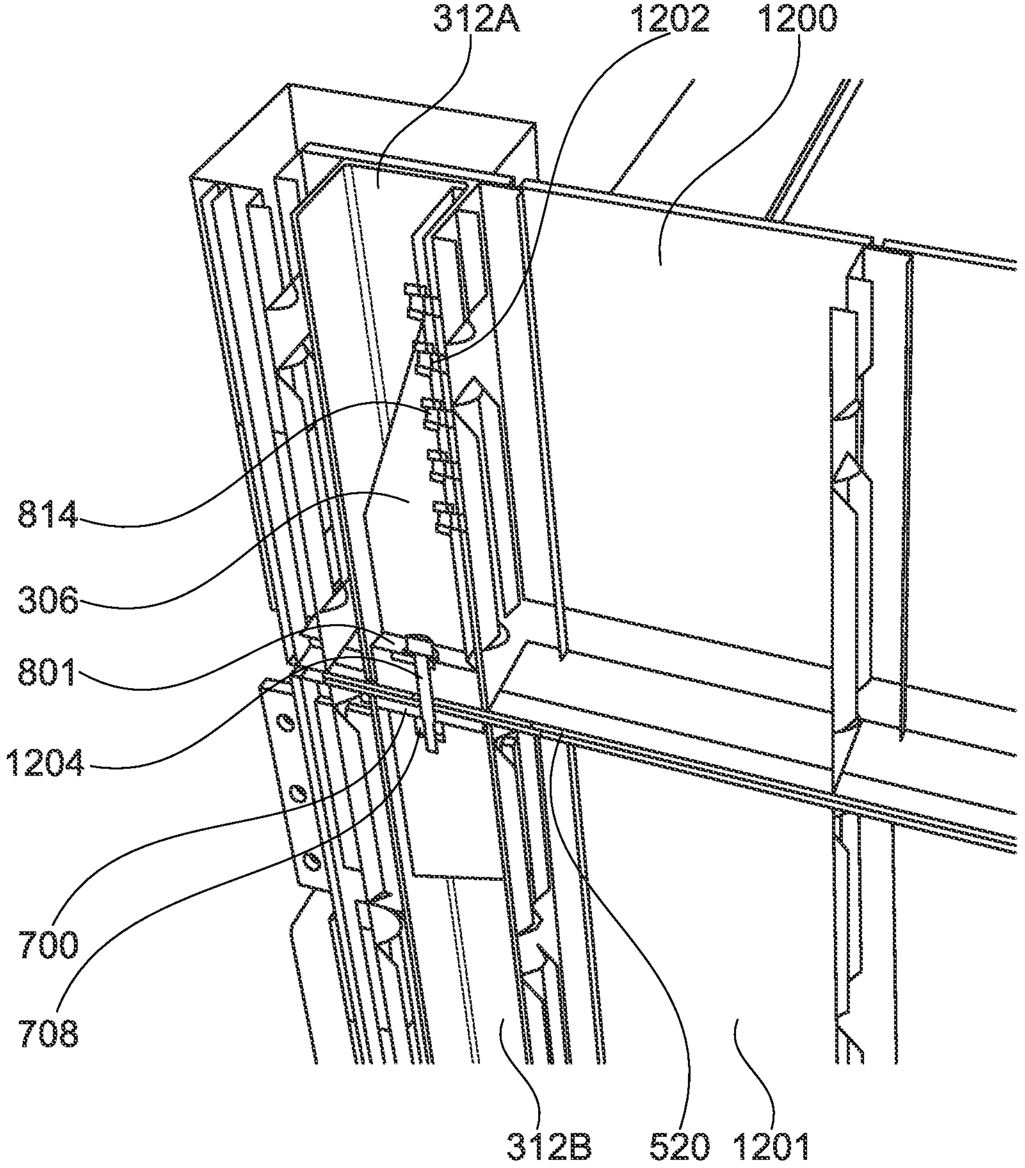
FIG. 12 is a cutaway view showing parts of a load bearing wall that may be attached to a spigot, in accordance with various implementations.

In the implementation of FIG. 11, wherein the side of the tubular member 312 (at location 1102) is exposed, the bolts may be inserted into the holes exposed at the exterior facing side of the tubular member 312 at the location 1102, and tightened using wrenches or other tools before a facia or other exterior layer covers the location 1102. FIG. 12 shows another implementation, wherein holes in the tubular member 312 may be disposed at a different location.

For example, FIG. 12 is a side cutaway view showing parts of a load bearing wall 1200 that may be attached to a spigot 306, in accordance with various implementations, wherein holes 1202 of the tubular member 312A are disposed at an interior facing side of the tubular member 312. With this implementation, bolts may be inserted from the interior of the wall 1200 through the holes 1202 so as to engage with the captive nuts 814 of the spigot 306. An access panel may be provided at the wall 1200 in order to enable wrench/tool access to the bolts being inserted from the interior of the wall 1200.

Moreover, FIG. 12 shows a bolt 1204 running through a hole in the mounting base 801 of the spigot 306. The bolt 1204 then runs through the plate 520 of a lower wall 1201 underneath the wall 1200, and then through the cap 700 of the tubular member 312B of the wall 1201 so as to engage with the captive nut 708. When tightened (e.g., on site with a tool prior to tubular member 312A of the upper wall 1200 being lowered into position around the spigot 306), the bolt 1204 stiffens the connection between the spigot 306 and the tubular member 312B. Thus, when there are multiple spigots 306 arranged vertically between and that join together serially/vertically positioned tubular members 312 (in combination with the caps 700 and the protrusions 704 adjacent to the spigots 306), a result is stiffer joints along the vertical direction and providing a feature by which shear walls resist axial overturning forces during a seismic event. Also, the tightened bolts 1204 provide additional tension between the tubular members 312 to further securely hold the walls in place.

Figure 13:
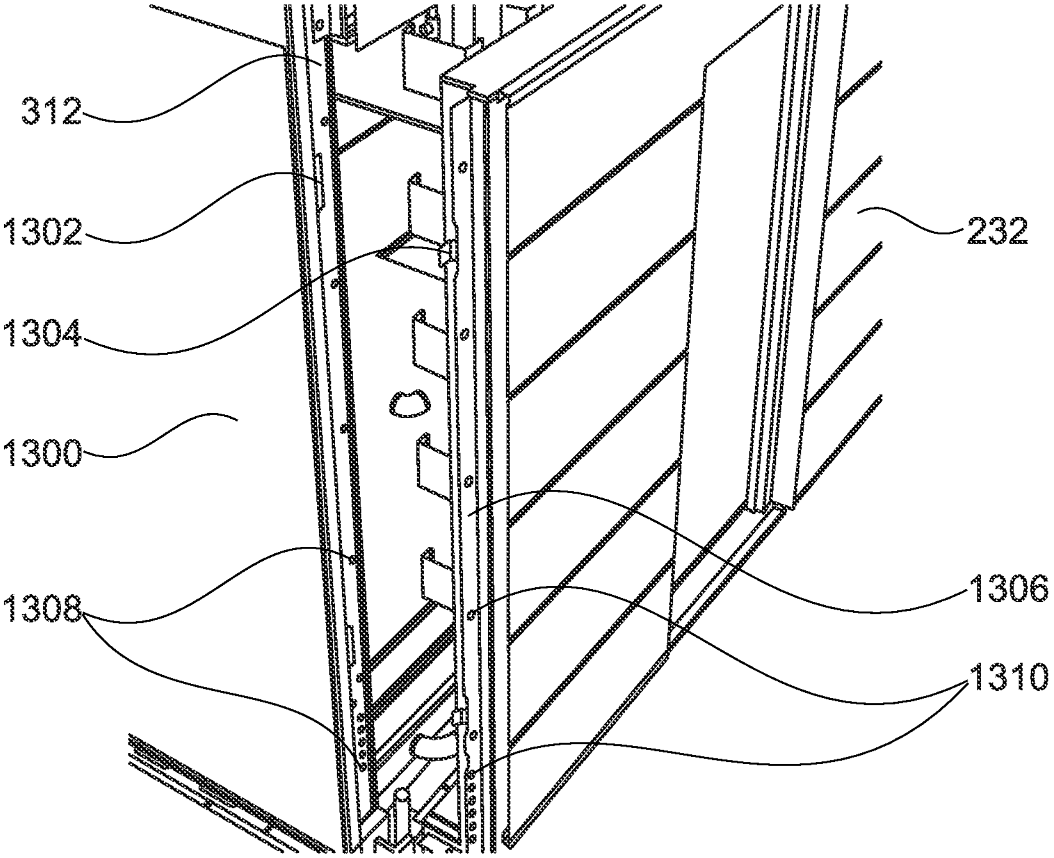
FIG. 13 shows features of a load bearing wall to enable a utility wall to be hung from the load bearing wall.

FIG. 13 shows features of a load bearing wall 1300 to enable a utility wall 232 to be hung from the load bearing wall 1300. More specifically, the tubular member 312 (or 314) of the wall 1300 is formed with a plurality of slots 1302. The slots 1302 are sized and shaped to receive a corresponding plurality of tabs 1304 of the utility wall 232.

According to various embodiments, the utility wall 232 includes an angle 1306 that runs along both of its vertical edges. The angle 1306 includes or is formed with the plurality of tabs 1304 that fits into the slots 1302 of the wall 1300.

The tabs 1304 may have any suitable shape. For example, the tabs 1304 may have a tapered shape so as to be more easily inserted into the slots 1302. The tabs 1304 may also have a hook-shaped configuration in some implementations, so as to provide more secure placement. In still other implementations, the tabs 1304 may be located on the wall 1300, and the slots 1302 may be located on the utility wall 232.

Further attachment mechanisms may be used to hold the utility wall 232 in place. For instance, the tubular member 312 may be provided with a plurality of holes 1308, some of which may be alignment holes and some of which may be holes to receive fasteners (such as screws or bolts) that are inserted into corresponding holes 1310 formed in the angle 1306 of the utility wall 232, thereby further securely attaching the utility wall 232 to the wall 1300.

Figure 15:
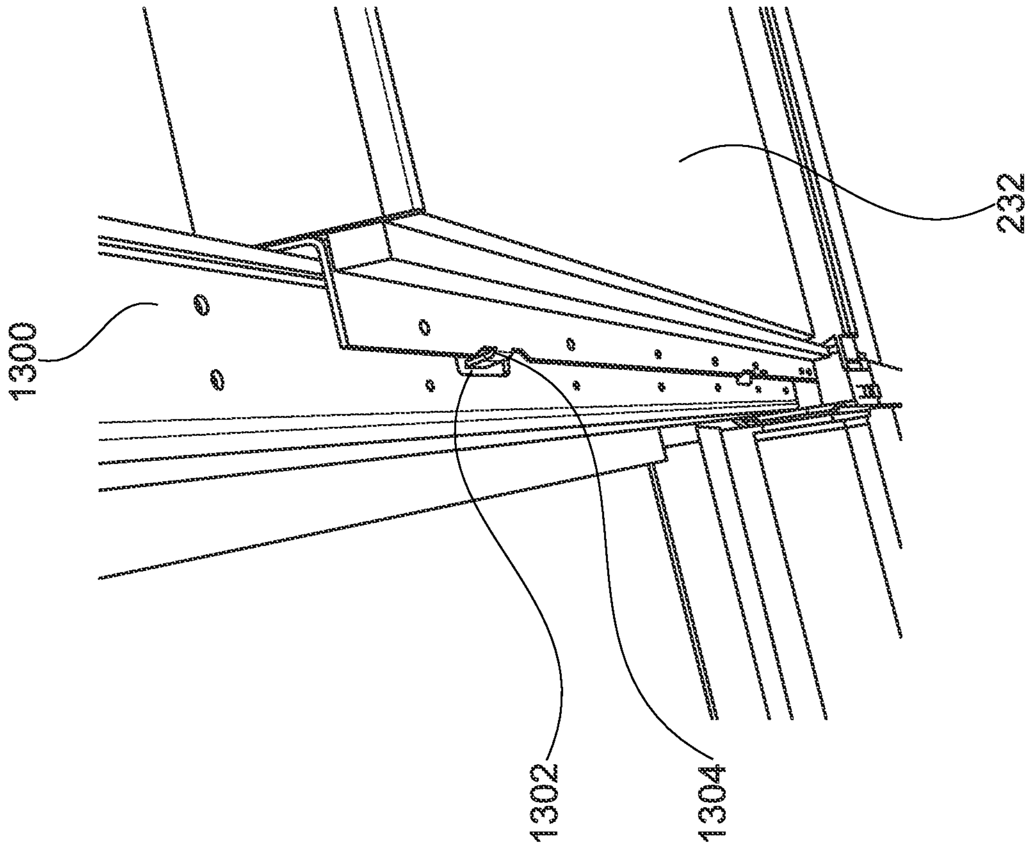
FIGS. 14 and 15 show the load bearing wall of FIG. 13 having the utility wall hung therefrom.
Figure 14:
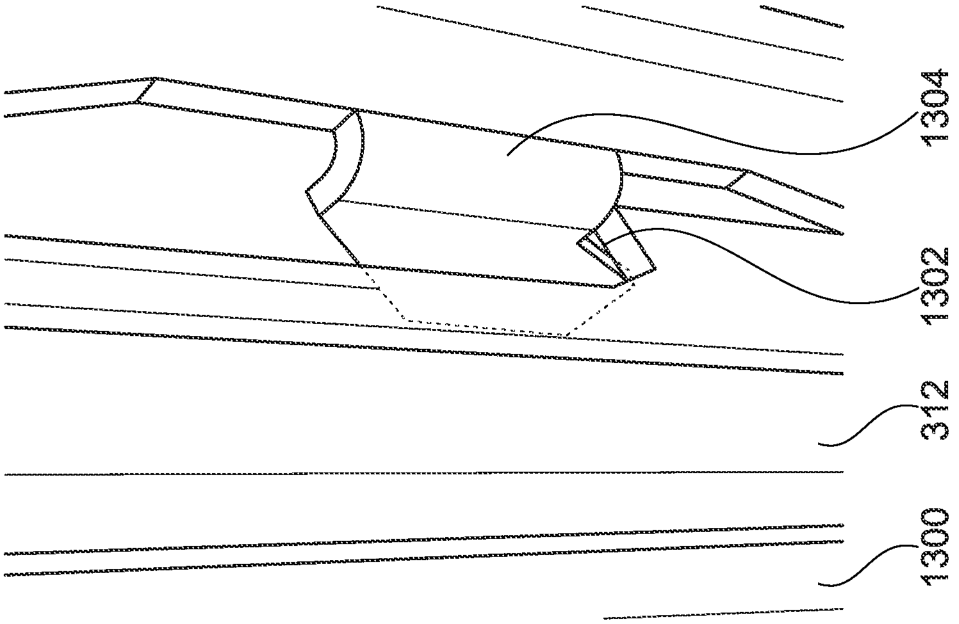

FIGS. 14 and 15 show the load bearing wall 1300 of FIG. 13 having the utility wall 232 hung therefrom. In FIG. 14, the tab 1304 has a downward hook shape, such that when the tab 1304 is inserted into the slot 1302 of the tubular member 312 of the wall 1300, the weight of the utility wall 232 hooks the tab 1304 firmly against the lower edge of the slot 1302. FIG. 15 shows the utility wall 232 in its fitted/hung position against the wall 1300.

Figure 16:
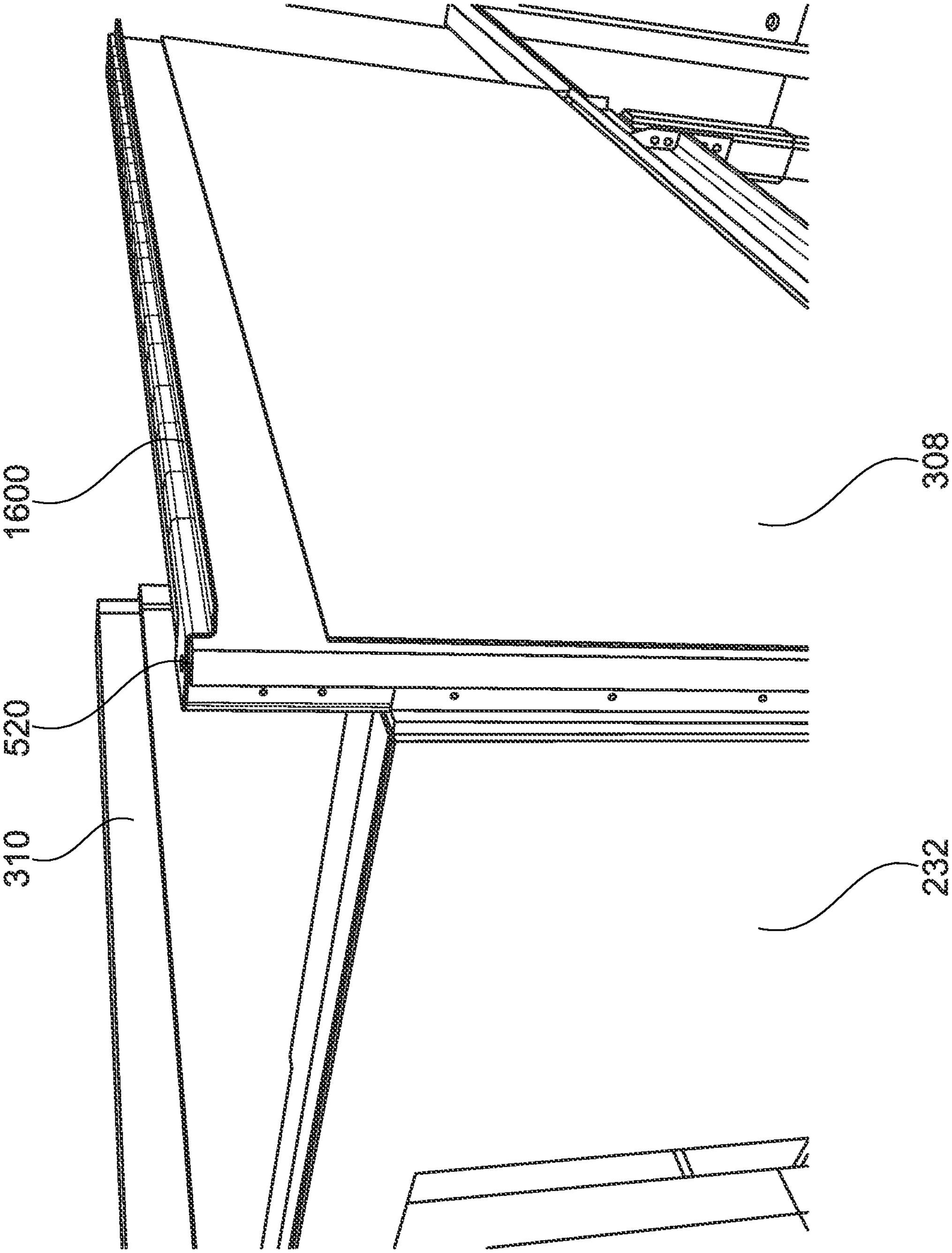
FIG. 16 show a feature of a load bearing wall for supporting a corridor panel, in accordance with some implementations.

FIG. 16 show a feature of a load bearing wall (e.g., the end wall 308) for supporting a corridor panel located on the next floor level above, in accordance with some implementations. More specifically, a z-plate 1600 has a first leg positioned horizontally over the plate 520 of the wall 308. The z-plate 1600 may run continuously or in sections along the upper surface of the wall 308, from the proximal end to the distal end of the wall 308.

A second leg of the z-plate 1600 projects outwardly from the face of the wall 308, so as to form a ledge-like support structure. The ledge-like support structure of the z-plate 1600 may be used to support an angle of a corridor panel (a floor-ceiling panel running along a hallway/corridor), in a manner somewhat analogous to the plate 520 of the wall 310 in FIG. 3 supporting the horizontal section 502 of the angle 302 of the floor-ceiling panel 400.

Figure 17:
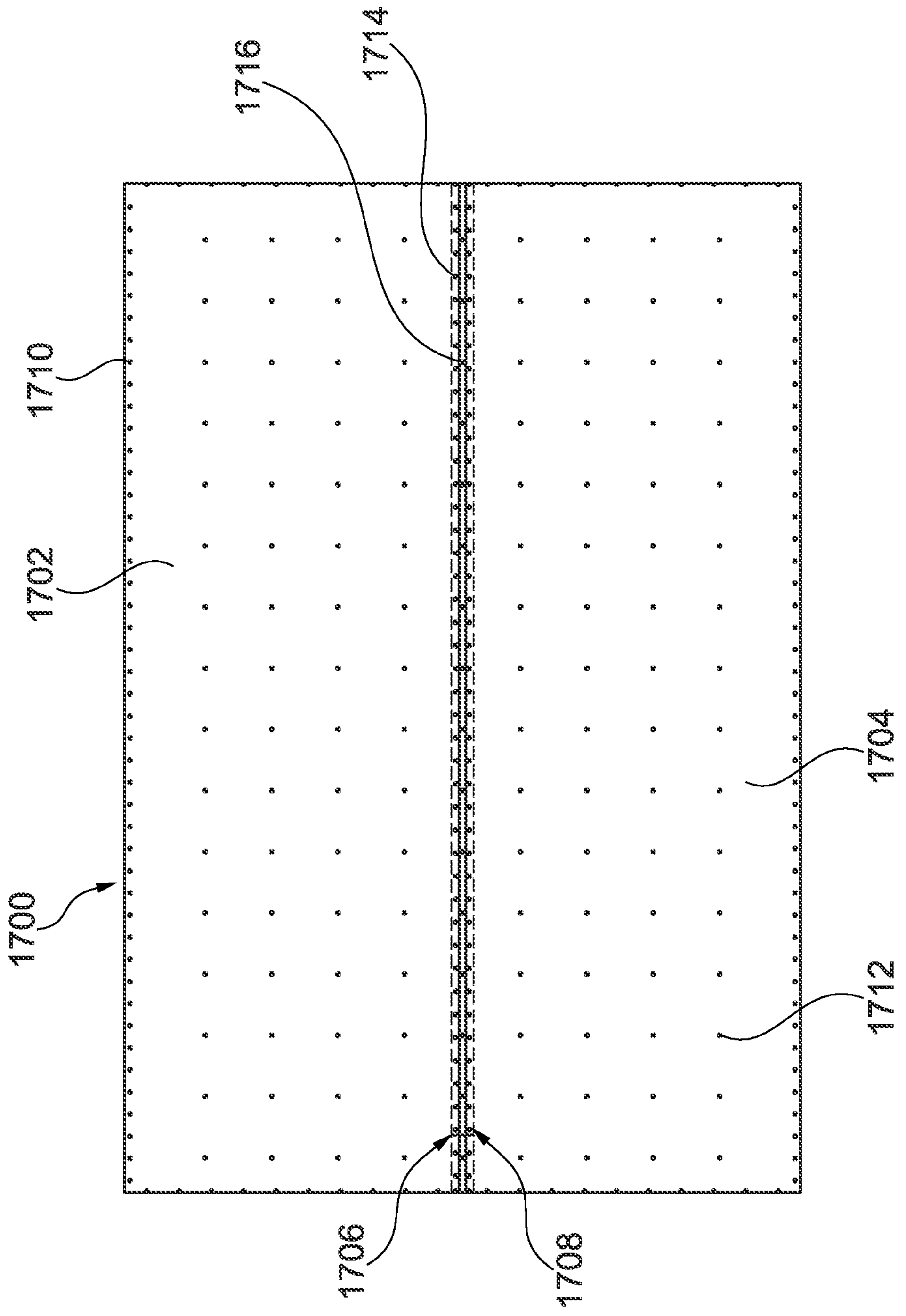
FIG. 17 is a front view of sheets of metal of a load bearing wall, in accordance with some implementations.

FIG. 17 is a front view of sheets of metal (e.g., the metal layer 516 of FIG. 5 and shown in the other previous figures) of a load bearing wall 1700, in accordance with some implementations. The sheets comprise a first sheet 1702 that runs along an upper region of the wall 1700 and a second sheet 1704 that runs along a lower region of the wall 1700. A metal strip 1706 underlies a seam 1708 between the first sheet 1702 and the second sheet 1704.

The first sheet 1702 and the second sheet 1704 are attached (along a perimeter of the wall 1700) to the underlying upper and lower tracks and to the tubular members of the wall 1700, via a first set of screws 1710. The screws 1710 may be relatively closely spaced, for example 2 inches on center, so as to provide structural strength and rigidity to the diaphragm formed by the first sheet 1702 and the second sheet 1704.

A second set of screws 1712 may be used to attach the first sheet 1702 and the second sheet 1704 to the vertically running parallel studs 510 of the wall 1700. The second set of screws 1712 may be spaced apart at a relatively longer spacing, such as 6 inches or 12 inches on center.

The first sheet 1702 and the second sheet 1704 may be attached to the metal strip 1706 using a third set of screws 1714 that run horizontally above and below the seam 1708. The spacing between the third set of screws may be, for example, 2 inches on center. Furthermore, the metal strip 1706 provides a landing location for screws 1716, at the seam 1708, so as to enable the metal strip 1706 to be attached to the studs 510 of the wall 1700.

According to various embodiments, the first sheet 1702 and the second sheet 1704 (as well as the metal strip 1706) are fastened by these various screws only to the studs 510 and upper and lower tracks, and affixed to the tubular members via welds adjacent to studs. Then, any other layer that overlies the first sheet 1702 and the second sheet 1704, such as gypsum boards or other exterior layers, are fastened (via screws) only to the first sheet 1702 and the second sheet 1704, and not to the studs 510, tracks, and tubular members. This discontinuity provides improved acoustical performance (e.g., sound proofing).

Moreover, the first sheet 1702 and the second sheet 1704 also improve the fire rating and acoustical separation between occupiable space of the building, and provide an air barrier between interior and exterior climates. Pre-installed electrical and/or plumbing utilities can comprise parts of the load bearing wall 1700 and other load bearing walls described herein, and may overlie the first sheet 1702 and the second sheet 1704.

The first sheet 1702 and the second sheet 1704 may be 20 gauge in thickness, for example. The metal strip 1706 may be flat stock that is 4 inches wide and 18 gauge in thickness, for example.

According to various embodiments, the gauges/dimensions/configuration of the studs and tubular members, of all load bearing walls in the building 100, may be generally uniform from one wall to another wall, whether a shear wall versus a demising wall that is not a shear wall and/or whether an upper story wall versus a lower story wall. The stability/capability of shear walls to withstand lateral forces may be provided at least in part by the more robust configuration of the spigots 306 used to support the shear walls. For example and as shown and described above, shear walls may be attached to spigots 306 with stronger brace configurations and a higher number of attachment (bolt) connections to tubular members of shear walls, as compared to non-shear walls that have less robust configurations for and fewer attachment connections to their respective spigots.

Furthermore, screw patterns for the metal layer 516 may vary (e.g., relatively closer versus relatively further spacing between screws) between shear walls and non-shear walls. For example, shear walls may use relatively closer screw spacing compared to non-shear walls. Progressively wider screw spacing may also be used for walls, going from lower stories to upper stories of the building.

In other embodiments, the shapes, dimensions, and configurations of studs and support members at their ends (which may not necessarily be tubular in shape in some embodiments) may vary between shear and non-shear walls, and/or may vary between floor levels. For instance, thicker stud gauges and/or more robust configurations of support members at the ends of the walls may be present for shear walls as compared to non-shear walls. Thinner and/or otherwise relatively less stronger configurations also may be present when going from a lower floor level to an upper floor level.

Such an arrangements described above may be due to the walls on upper floors having to bear less (lighter) loads than walls on lower floors, and so stud arrangements/thicknesses that can withstand smaller vertical loads may be used for upper levels of a building. Moreover, the less robust stud arrangement(s) can be used at the upper levels since there may be less shearing forces at the upper floor levels relative to lower floor levels.

The present disclosure is not to be limited in terms of the particular embodiments described in this application, which are intended as illustrations of various aspects. Many modifications and embodiments can be made without departing from its spirit and scope. Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can, of course, vary. The terminology used herein is for the purpose of describing particular embodiments only, and is not intended to be limiting.

With respect to the use of substantially any plural and/or singular terms herein, the terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Such depicted architectures are merely embodiments, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A pre-manufactured load bearing wall for a multi-story building, the load bearing wall comprising:

a plurality of parallel vertical metal studs;

a first track affixed to an upper end of the studs a second track affixed to a lower end of the studs;

a first vertical support member at a first edge of the wall;

a second vertical support member at a second edge of the wall;

a metal plate that runs between the first and second edges of the wall, and affixed to the first and second vertical support members and to the first track, wherein the plate is configured to support a horizontal section of a first angle of a floor-ceiling panel such that the floor-ceiling panel is hung from the load bearing wall;

a horizontal member that runs between the first and second edges of the wall, that is affixed to the second track, and that extends laterally away from the second track, wherein the horizontal member is configured to be affixed to a second angle of the floor-ceiling panel to provide a load path for a lateral load; and a stiffener device located at a top end of each of the first and second vertical support members, wherein the stiffener device is configured to provide rigidity for a joint between the first and second vertical support members and corresponding vertical support members respectively positioned serially above the first and second vertical support members.

2. The load bearing wall of claim 1, wherein the first and second vertical support members each comprise a hollow metal tube.

3. The load bearing wall of claim 1, wherein the first and second vertical support members are each affixed to a respective outer stud amongst the studs.

4. The load bearing wall of claim 1, wherein the first and second vertical support members each comprise a hollow metal tube, and wherein the stiffener device comprises:

a cap sized and shaped to fit an opening at the top end of the tube; and a protrusion that extends through a slot formed in a wall of the tube at the top end of the tube.

5. The load bearing wall of claim 1, wherein the first and second vertical support members each comprise a hollow metal tube, and wherein an opening at a bottom end of the tube is sized and shaped to accommodate a spigot that is configured to secure and align the load bearing wall to an underlying structure.

6. The load bearing wall of claim 5, wherein the tube has a wall formed with holes to accommodate a corresponding plurality of fasteners to fixedly attach the tube to the spigot.

7. The load bearing wall of claim 1, wherein the studs are spaced apart by about 16 inches.

8. The load bearing wall of claim 1, further comprising a metal layer affixed to the studs, to the first and second tracks, and to outer studs respectively attached to the first and second vertical support members, wherein:

the metal layer is affixed by a first set of screws to the first and second tracks and to the outer studs, wherein the first set of screws affix the metal layer to a perimeter of the load bearing wall according to a first screw pattern, the metal layer is affixed by a second set of screws to the studs according to a second screw pattern, and the first screw pattern includes more closely spaced screws relative to the second screw pattern.

9. The load bearing wall of claim 8, wherein the metal layer is affixed by the first and second screws to only the first and second tracks, the studs, and the outer studs, and wherein the load bearing wall further comprises:

an outer layer that overlies the metal layer, wherein the outer layer is affixed by screws to only the metal layer, and is not affixed by screws to the first and second tracks, the studs, and the outer studs.

10. The load bearing wall of claim 1, wherein the plate has holes formed therein for alignment with corresponding holes formed in the horizontal section of the first angle of the floor-ceiling panel.

11. The load bearing wall of claim 1, wherein the first and second vertical support members each comprise a plurality of studs bundled together.

12. The load bearing wall of claim 1, wherein the load bearing wall is a demising wall that is a not a shear wall.

13. The load bearing wall of claim 1, wherein the load bearing wall is an end wall that is also a shear wall.

14. A multi-story building, comprising:

a pre-manufactured floor-ceiling panel; and a pre-manufactured load bearing wall that includes:

a plurality of parallel vertical metal studs;

a first track affixed to an upper end of the studs a second track affixed to a lower end of the studs;

a first vertical support member at a first edge of the wall;

a second vertical support member at a second edge of the wall;

a metal plate that runs between the first and second edges of the wall, and affixed to the first and second vertical support members and to the first track, wherein the plate is configured to support a horizontal section of a first angle of the floor-ceiling panel such that the floor-ceiling panel is hung from the load bearing wall;

a horizontal member that runs between the first and second edges of the wall, that is affixed to the second track, and that extends laterally away from the second track, wherein the horizontal member is configured to be affixed to a second angle of the floor-ceiling panel to provide a load path for a lateral load; and a stiffener device located at a top end of each of the first and second vertical support members, wherein the stiffener device is configured to provide rigidity for a joint between the first and second vertical support members and corresponding vertical support members respectively positioned serially above the first and second vertical support members.

15. The building of claim 14, wherein the first and second vertical support members each comprise a hollow metal tube, and wherein the building further comprises:

a spigot configured to secure and align the load bearing wall to an underlying structure, wherein an opening at a bottom end of the tube is sized and shaped to accommodate the spigot, and wherein the tube has a wall formed with holes to accommodate a corresponding plurality of fasteners to fixedly attach the tube to the spigot.

16. The building of claim 14, wherein the building includes a plurality of the load bearing walls at each story of the building, and wherein structural strength of the load bearing walls to handle vertical and lateral loads increases from upper stories to lower stories of the building.

17. A method to manufacture a load bearing wall for a multi-story building, the method comprising:

affixing a first track to an upper end of a plurality of parallel vertical metal studs;

affixing a second track to a lower end of the studs;

affixing a first vertical support member to a first outer stud at a first edge of the wall;

affixing a second vertical support member to a second outer stud at a second edge of the wall;

affixing a metal plate, which runs between the first and second edges of the wall, to the first and second vertical support members and to the first track, wherein the plate is configured to support a horizontal section of a first angle of a floor-ceiling panel such that the floor-ceiling panel is hung from the load bearing wall;

affixing a horizontal member, which runs between the first and second edges of the wall, to the second track such that the horizontal member extends laterally away from the second track, wherein the horizontal member is configured to be affixed to a second angle of the floor-ceiling panel to provide a load path for a lateral load; and placing a stiffener device at a top end of each of the first and second vertical support members, wherein the stiffener device is configured to provide rigidity for a joint between the first and second vertical support members and corresponding vertical support members respectively positioned serially above the first and second vertical support members.

18. The method of claim 17, wherein the first and second vertical support members each comprise a hollow metal tube, and wherein the method further comprises:

fitting a cap into an opening at the top end of the tube;

forming a slot in a wall of the tube at the top end of the tube; and extending a protrusion through the slot.

19. The method of claim 17, wherein the first and second vertical support members each comprise a hollow metal tube, wherein an opening at a bottom end of the tube is sized and shaped to accommodate a spigot that is configured to secure and align the load bearing wall to an underlying structure, and wherein the method further comprises forming holes in wall of the tube to accommodate a corresponding plurality of fasteners to fixedly attach the tube to the spigot.

20. The method of claim 17, further comprising:

affixing a metal layer to the studs, to the first and second tracks, and to outer studs respectively attached to the first and second vertical support members, wherein:

the metal layer is affixed by a first set of screws to the first and second tracks and to the outer studs, wherein the first set of screws affix the metal layer to a perimeter of the load bearing wall according to a first screw pattern, the metal layer is affixed by a second set of screws to the studs according to a second screw pattern, and the first screw pattern includes more closely spaced screws relative to the second screw pattern.

* * * * *